(12) United States Patent
Gschwind et al.

(10) Patent No.: US 10,152,419 B2
(45) Date of Patent: *Dec. 11, 2018

(54) DEFERRED RESPONSE TO A PREFETCH REQUEST

(71) Applicant: International Business Machines Corporation, Armonk, NY (US)

(72) Inventors: Michael Karl Gschwind, Chappaqua, NY (US); Valentina Salapura, Chappaqua, NY (US); Chung-Lung K. Shum, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 196 days.

This patent is subject to a terminal disclaimer.

(21) Appl. No.: 14/936,951

(22) Filed: Nov. 10, 2015

(65) Prior Publication Data
US 2017/0131900 A1    May 11, 2017

(51) Int. Cl.
*G06F 12/08* (2016.01)
*G06F 12/0862* (2016.01)
(Continued)

(52) U.S. Cl.
CPC ........ *G06F 12/0862* (2013.01); *G06F 3/061* (2013.01); *G06F 3/0659* (2013.01); *G06F 3/0683* (2013.01); *G06F 12/084* (2013.01); *G06F 12/0811* (2013.01); *G06F 12/0815* (2013.01); *G06F 12/0842* (2013.01); *G06F 12/0844* (2013.01); *G06F 12/0875* (2013.01); *G06F 2212/1008* (2013.01);
(Continued)

(58) Field of Classification Search
None
See application file for complete search history.

(56) References Cited

U.S. PATENT DOCUMENTS 6,216,208 B1    4/2001 Greiner et al.
6,449,698 B1    9/2002 Deshpande et al.
(Continued)

OTHER PUBLICATIONS

Appendix P: List of IBM Patents or Patent Applications Treated as Related, Dated Aug. 12, 2016, pp. 1-2.
(Continued)

*Primary Examiner* — Tracy C. Chan
(74) *Attorney, Agent, or Firm* — Isaac J. Gooshaw

(57) ABSTRACT

Preventing a prefetch memory operation from causing a transaction to abort by receiving by a local processor a prefetch request from a remote processor. Determining whether the prefetch request conflicts with a transaction of the local processor. Responding to at least one of i) a determination that the local processor has no transaction, and ii) a determination that the prefetch request does not conflict with a transaction of the local processor, by providing a requested prefetch data. Responding to a determination that the prefetch request conflicts with a transaction of the local processor by determining an evaluation of the prefetch request. Performing at least one of i) an abort of the prefetch request, ii) a quiesce the prefetch request, iii) a delay in the processing of the prefetch request for a delay period, and iv) an execution of the prefetch request based on the evaluation the prefetch request.

20 Claims, 10 Drawing Sheets

(51) Int. Cl.
*G06F 12/084* (2016.01)
*G06F 12/0842* (2016.01)
*G06F 12/0875* (2016.01)
*G06F 3/06* (2006.01)
*G06F 12/0811* (2016.01)
*G06F 12/0815* (2016.01)
*G06F 12/0844* (2016.01)

(52) U.S. Cl.
CPC ............... *G06F 2212/1016* (2013.01); *G06F 2212/1024* (2013.01); *G06F 2212/452* (2013.01); *G06F 2212/507* (2013.01); *G06F 2212/602* (2013.01); *G06F 2212/6028* (2013.01); *G06F 2212/62* (2013.01)

(56) References Cited

U.S. PATENT DOCUMENTS

| | | | |
|---|---|---|---|
| 6,594,730 B1 * | 7/2003 | Hum | G06F 13/1673 711/118 |
| 6,732,242 B2 | 5/2004 | Hill et al. | |
| 6,760,817 B2 | 7/2004 | Arimilli et al. | |
| 6,981,099 B2 | 12/2005 | Paulraj et al. | |
| 7,386,701 B2 | 6/2008 | Mowry | |
| 7,657,729 B2 | 2/2010 | El-Essawy et al. | |
| 7,904,661 B2 | 3/2011 | Fluhr et al. | |
| 7,958,316 B2 | 6/2011 | Speight et al. | |
| 8,099,492 B2 | 1/2012 | Dahlin et al. | |
| 8,103,832 B2 | 1/2012 | Gara et al. | |
| 8,327,077 B2 | 12/2012 | Boyle et al. | |
| 8,356,143 B1 | 1/2013 | Bulusu et al. | |
| 2003/0009632 A1 * | 1/2003 | Arimilli | G06F 12/0813 711/137 |
| 2008/0244135 A1 | 10/2008 | Akesson et al. | |
| 2009/0198907 A1 * | 8/2009 | Speight | G06F 12/0862 711/137 |
| 2009/0199190 A1 * | 8/2009 | Chen | G06F 9/383 718/102 |
| 2009/0265532 A1 | 10/2009 | Caprioli et al. | |
| 2010/0205502 A1 | 8/2010 | Tanaka et al. | |
| 2011/0066811 A1 | 3/2011 | Sander et al. | |
| 2011/0320523 A1 | 12/2011 | Chan et al. | |
| 2012/0144124 A1 | 6/2012 | Lepak et al. | |
| 2012/0166694 A1 | 6/2012 | Dosh | |
| 2012/0166733 A1 | 6/2012 | Cherukuri et al. | |
| 2012/0311270 A1 * | 12/2012 | Sun | G06F 12/0862 711/137 |
| 2013/0031312 A1 * | 1/2013 | Jones | G06F 12/0862 711/137 |
| 2013/0042074 A1 | 2/2013 | Kadambi et al. | |
| 2013/0054853 A1 * | 2/2013 | Wang | G06F 13/161 710/110 |
| 2014/0325159 A1 * | 10/2014 | Meredith | G06F 12/0862 711/135 |

OTHER PUBLICATIONS

Gschwind et al.; U.S. Appl. No. 15/186,986, filed Jun. 20, 2016; Entitled "Deferred Response to a Prefetch Request".

Ebrahimi et al.; "Coordinated Control of Multiple Prefetchers in Multi-Core Systems"; MICRO'09; Dec. 12-16, 2009; pp. 1-11; ACM; New York, NY.

Kang et al.; "To Hardware Prefetch or Not to Prefetch?: A Virtualized Environment Study and Core Binding Approach"; ASPLOS'13; Mar. 16-20, 2013; pp. 357-368; ACM; Houston, TX.

Karlsson et al.; "Effectiveness of Dynamic Prefetching in Multiple-Writer Distributed Virtual Shared Memory Systems"; CiteSeerx; 1997; pp. 1-24; <http://citeseerx.ist.psu.edu/viewdoc/versions?doi=10.1.1.22.5282>.

Wallin et al.; "Bundling: Reducing the Overhead of Multiprocessor Prefetchers"; Proceedings of the 18th International Parallel and Distributed Processing Symposium (IPDPS'04); © 2004, IEEE; 10 pages.

Zhang et al., "Friendly Virtual Machines: Leveraging a Feedback-Control Model for Application Adaptation", Proceedings of 1st ACM/USENIX International Conference on Virtual Execution Environments (VEE) 2005, Jun. 2005, 10 pages, ACM, <http://dl.acm.org/citation.cfm?id=1064983&CFID=705099099&CFTOKEN=79562659>.

\* cited by examiner

DEFERRED RESPONSE TO A PREFETCH REQUEST

BACKGROUND OF THE INVENTION

The present invention relates generally to the field of computer memory management, and more specifically to techniques for improving the efficiency of transactional memory operations.

Many computer systems employ cache memory to speed data retrieval operations. Cache memory stores copies of data found in frequently used main memory locations. Accessing data from cache memory speeds processing because cache memory can typically be accessed faster than main memory. If requested data is found in cache memory, then it is accessed from cache memory. However, if requested data is not found in cache memory, then the data is first copied into cache memory and then accessed from the cache memory.

Multi-level cache is a structure in which there are multiple cache memories. For example, a computing system may have three levels, i.e. an L1 cache, an L2 cache, and an L3 cache. Typically, in a multi-level cache configuration, L1 is the smallest and with a short access time. If requested data is not found in L1 cache, the system searches the L2 cache, which is usually than L1 cache and physically further away than the L1 cache, thus, with a greater access time. In a similar fashion, if the data is not found in the L2 cache, the L3 cache is searched. Main memory is only accessed if the requested data is not in the L1, L2, or L3 caches. There are many different implementations of cache memory.

To improve performance, a computer architecture often includes prefetch instructions that can move data from main memory or a lower cache level to a higher cache level (closer to the processor) in anticipation of an access to the data. The execution of a prefetch instruction can be speculative in nature in that it may be performed before it is known that the data moved by the prefetch instruction will actually be accessed. Data in anticipation of either a read access or a write access may be prefetched, which is called a read prefetch or a write prefetch respectively. Cache coherency protocols in computers, that enable the sharing, synchronization, and parallel processing of data, often require a processor to gain ownership of the data before it can be written to (i.e., changed). Because the data may be currently owned by another processor, gaining ownership can be a lengthy process. The concept of ownership is necessary to prevent data that is being read by one processor from a memory location from being changed by another processor that writes to the same location or a different location (if copies of the data are in multiple different locations). Therefore it is often advantageous for a processor to execute a write prefetch instruction to gain ownership of the data in anticipation of writing to the data so that processing is not delayed while ownership is acquired.

Since the access time of a cache is often critical to the performance of a code that is executing, and a cache is often busy with many operations (e.g., servicing misses), it is beneficial to decrease a cache's workload, if possible. One common technique used to decrease a cache's workload includes accumulating multiple stores that store into to a common cache line in a cache line buffer, and then storing the contents of the cache line buffer into a cache as a single operation. This decreases a cache's workload and improves its response time and, thus, potentially improves the performance of a code that is executing. Such a technique is commonly performed in a mechanism called a store cache.

Transactional memory is a type of memory operation that groups one or more load and store operations performed by a processor into a single transaction that is visible to other processors as a single operation when the transaction completes. The effects (e.g., the data) of multiple store operations participating in the single transaction are not made visible to other processors until the transaction is complete. A transactional load is a load that accesses and buffers data until a transaction completes, after which the data is forwarded to the processor that requested it. If the data from a transactional load is changed (i.e., its location in memory written to) after the load occurs and before the transaction completes, the transaction is aborted. A transactional write is a write whose data is not seen until the transaction completes. A read from or a write to a location that is the target of a transactional write in a transaction aborts the transaction. Transactional memory is often helpful in synchronizing work that is performed in parallel on multiple CPUs (by enabling atomic operations on an arbitrary set of memory locations) and when multiple writes must not be interrupted. Since writes that participate in a transaction are not visible until the transaction completes, a read from a location that is going to be written by a write in the transaction aborts the transaction.

SUMMARY

Embodiments of the present invention provide a method, system, and program product to prevent a prefetch memory operation from causing a transaction to abort. A local processor, of a group of one or more processors, receives a prefetch request from a remote processor. The group of one or more processors determines whether the prefetch request conflicts with a transaction of the local processor. The group of one or more processors responds to at least one of i) a determination that the local processor has no transaction, and ii) a determination that the prefetch request does not conflict with a transaction of the local processor, by providing a requested prefetch data. The group of one or more processors responds to a determination that the prefetch request conflicts with a transaction of the local processor by determining an evaluation of the prefetch request. The group of one or more processors performs at least one of i) an abort of the prefetch request, ii) a quiesce the prefetch request, iii) a delay in the processing of the prefetch request for a delay period, and iv) an execution of the prefetch request, based, at least in part, on the evaluation the prefetch request.

DETAILED DESCRIPTION

Figure 1:
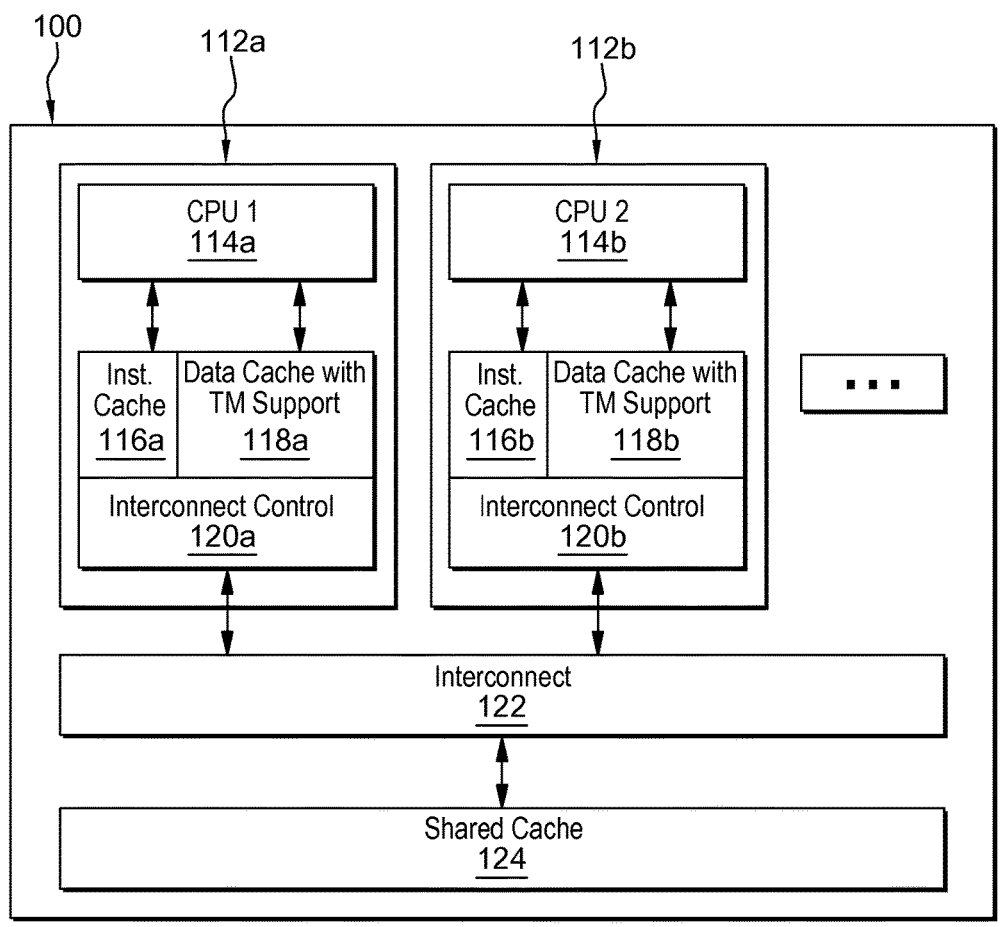
FIG. 1 depicts an example multicore transactional memory environment, in accordance with an illustrative embodiment.

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A memory hierarchy in a modern computer often includes multiple layers of cache, some layers dedicated to, and accessible by, a single processor and other, lower and larger layers of cache accessible by multiple processors. A cache often provides a quick access to recently accessed data or to data near recently accessed data. Caches are given labels in their order of logical position relative to a given processor, L1, L2, L3, etc., with the L1 cache logically nearest to the processor. This ordering is also the order in which the caches are accessed when the processor is attempting to read data. L1 is first accessed for the data, then L2 if the data is not found in L1, and so on. An L0 cache is sometimes employed that is small and tightly integrated with the processor, often providing 1-cycle access. An L0 cache, if it exists, is logically closer to the processor than an L1 cache. The levels of cache in a computer system, together with the main memory (often a large dynamic RAM), constitute the memory hierarchy of the computer system. In the context of a memory hierarchy, the term "below" means logically further away from the processor.

Many techniques have been developed to increase the efficiency of a memory hierarchy. Memory hierarchy efficiency relative to a benchmark program is usually measured by its average access time during the execution of the benchmark program. A store cache is a technique that improves average access time by decreasing the workload of a cache in the next cache layer below that of the store cache. It does this by accumulating stores to a cache line in a buffer and then writing the contents of the buffer to the cache line in the next layer of cache in one access, eliminating the multiple accesses that would have transpired had each separate store performed a store operation.

In modern computing systems that have multiple processors, there is an effort to increase performance by computing parts of a program in parallel on the same processor, if the processor is multithreaded and/or on multiple different processors, and combine or compare results as needed intermittently during an execution. This is often accomplished by synchronizing multiple threads of execution on the same or different processors, and/or making results produced by one thread of execution visible to other threads of execution. Synchronization is often accomplished by executing "atomic" instructions and groups of instructions. An atomic instruction appears to execute "all at once" to other threads of execution and to other processors, i.e., the atomic instruction can never be observed to be partially complete. In like manner, a group of instructions may be made atomic by making their effect visible all at once to other threads and processors. Memory operations are often available in an atomic version because multiple threads of execution often communicate and synchronize with each other through values written to and read from memory locations known by all participating threads of execution. For example, an atomic instruction may read a memory location, and if the memory location contains a specific value, write another value back to the same memory location in a single atomic operation. This action would tell other processes that may be testing the variable (by reading it).

A modern technique that may improve the performance of an application executing on a processor is to execute some instructions speculatively when there resources available to do so. Speculative execution is a term that refers to an execution that is probably going to happen in the future, but may not actually happen. This usually occurs when a branch instruction is seen in the instruction stream and its behavior is predicted based on previous behavior, because the information that determines its actual behavior is not yet available. Instead of waiting for this information to become available, the processor can do work based on a predicted path that this branch will probably take, and execute instructions on this predicted path. The instructions executed on this predicted path are speculative instructions—until it is known that they are on an actual path of execution, i.e., that the branch was predicted correctly. If it turns out that these speculative instructions are on the wrong actual path of execution (wrong prediction), the effects of these instructions must be squashed, i.e., eliminated, undone, and not be visible to other processors.

Instructions that were executed speculatively but should not have been executed can be a demanding design challenge, and is especially demanding regarding speculative store instructions that should not have been executed. If a store that should not have been executed stores data to memory, it may overwrite data that should not have been overwritten, and the written data may be read and used by the same or a different processor in an application. Computer architectures solve this problem by not executing speculative store instructions, or by executing them speculatively and storing store results in a store buffer or store queue until the in-order point of the instruction (which decreases performance). An alternative approach is to prevent other threads of execution from seeing the data produced by a speculative store until it is known to be on the correct path, and to delete the data if it is a result of a store on an incorrect path.

Simultaneous multithreading is a technique often incorporated in modern processors that enables a single processor to execute multiple applications concurrently (or multiple parts of the same application), with each application having its own thread of execution. The single processor fetches instructions on each thread separately and executes the instructions on shared execution units (e.g., adders, multipliers, etc.) within the processor, all the while keeping track of which instructions belong to which thread. If such treads are synchronizing their work with other threads, they often do so via the execution of atomic instructions, or groups of instructions, whose execution is made atomic.

Historically, a computer system or processor had only a single processor (aka processing unit or central processing unit). The processor included an instruction processing unit (IPU), a branch unit, a memory control unit and the like. Such processors were capable of executing a single thread of a program at a time. Operating systems were developed that could time-share a processor by dispatching a program to be executed on the processor for a period of time, and then dispatching another program to be executed on the processor for another period of time. As technology evolved, memory subsystem caches were often added to the processor as well as complex dynamic address translation including translation lookaside buffers (TLBs). The IPU itself was often referred to as a processor. As technology continued to evolve, an entire processor could be packaged on a single semiconductor chip or die, such a processor was referred to as a microprocessor. Then processors were developed that incorporated multiple IPUs, such processors were often referred to as multi-processors. Each such processor of a multi-processor computer system (processor) may include individual or shared caches, memory interfaces, system bus, address translation mechanism and the like. Virtual machine and instruction set architecture (ISA) emulators added a layer of software to a processor, that provided the virtual machine with multiple "virtual processors" (aka processors) by time-slice usage of a single IPU in a single hardware processor. As technology further evolved, multi-threaded processors were developed, enabling a single hardware processor having a single multi-thread IPU to provide a capability of simultaneously executing threads of different programs, thus each thread of a multi-threaded processor appeared to the operating system as a processor. As technology further evolved, it was possible to put multiple processors (each having an IPU) on a single semiconductor chip or die. These processors were referred to processor cores or just cores. Thus the terms such as processor, central processing unit, processing unit, microprocessor, core, processor core, processor thread, and thread, for example, are often used interchangeably. Aspects of embodiments herein may be practiced by any or all processors including those shown supra, without departing from the teachings herein. Wherein the term "thread" or "processor thread" is used herein, it is expected that particular advantage of the embodiment may be had in a processor thread implementation.

Transaction Execution in Intel® Based Embodiments

In "Intel® Architecture Instruction Set Extensions Programming Reference" 319433-012A, February 2012, incorporated herein by reference in its entirety, Chapter 8 teaches, in part, that multithreaded applications may take advantage of increasing numbers of CPU cores to achieve higher performance. However, the writing of multi-threaded applications requires programmers to understand and take into account data sharing among the multiple threads. Access to shared data typically requires synchronization mechanisms. These synchronization mechanisms are used to ensure that multiple threads update shared data by serializing operations that are applied to the shared data, often through the use of a critical section that is protected by a lock. Since serialization limits concurrency, programmers try to limit the overhead due to synchronization.

Intel® Transactional Synchronization Extensions (Intel® TSX) allow a processor to dynamically determine whether threads need to be serialized through lock-protected critical sections, and to perform that serialization only when required. This allows the processor to expose and exploit concurrency that is hidden in an application because of dynamically unnecessary synchronization.

With Intel TSX, programmer-specified code regions (also referred to as "transactional regions" or just "transactions") are executed transactionally. If the transactional execution completes successfully, then all memory operations performed within the transactional region will appear to have occurred instantaneously when viewed from other processors. A processor makes the memory operations of the executed transaction, performed within the transactional region, visible to other processors only when a successful commit occurs, i.e., when the transaction successfully completes execution. This process is often referred to as an atomic commit.

Intel TSX provides two software interfaces to specify regions of code for transactional execution. Hardware Lock Elision (HLE) is a legacy compatible instruction set extension (comprising the XACQUIRE and XRELEASE prefixes) to specify transactional regions. Restricted Transactional Memory (RTM) is a new instruction set interface (comprising the XBEGIN, XEND, and XABORT instructions) for programmers to define transactional regions in a more flexible manner than that possible with HLE. HLE is for programmers who prefer the backward compatibility of the conventional mutual exclusion programming model and would like to run HLE-enabled software on legacy hardware but would also like to take advantage of the new lock elision capabilities on hardware with HLE support. RTM is for programmers who prefer a flexible interface to the transactional execution hardware. In addition, Intel TSX also provides an XTEST instruction. This instruction allows software to query whether the logical processor is transactionally executing in a transactional region identified by either HLE or RTM.

Since a successful transactional execution ensures an atomic commit, the processor executes the code region optimistically without explicit synchronization. If synchronization was unnecessary for that specific execution, execution can commit without any cross-thread serialization. If the processor cannot commit atomically, then the optimistic execution fails. When this happens, the processor will roll back the execution, a process referred to as a transactional abort. On a transactional abort, the processor will discard all updates performed in the memory region used by the transaction, restore architectural state to appear as if the optimistic execution never occurred, and resume execution non-transactionally.

A processor can perform a transactional abort for numerous reasons. A primary reason to abort a transaction is due to conflicting memory accesses between the transactionally executing logical processor and another logical processor. Such conflicting memory accesses may prevent a successful transactional execution. Memory addresses read from within a transactional region constitute the read-set of the transactional region and addresses written to within the transactional region constitute the write-set of the transactional region. Intel TSX maintains the read- and write-sets at the granularity of a cache line. A conflicting memory access occurs if another logical processor either reads a location that is part of the transactional region's write-set or writes a location that is a part of either the read- or write-set of the transactional region. A conflicting access typically means that serialization is required for this code region. Since Intel TSX detects data conflicts at the granularity of a cache line, unrelated data locations placed in the same cache line will be detected as conflicts that result in transactional aborts. Transactional aborts may also occur due to limited transactional resources. For example, the amount of data accessed in the region may exceed an implementation-specific capacity. Additionally, some instructions and system events may cause transactional aborts. Frequent transactional aborts result in wasted cycles and increased inefficiency.

Hardware Lock Elision

Hardware Lock Elision (HLE) provides a legacy compatible instruction set interface for programmers to use transactional execution. HLE provides two new instruction prefix hints: XACQUIRE and XRELEASE.

With HLE, a programmer adds the XACQUIRE prefix to the front of the instruction that is used to acquire the lock that is protecting the critical section. The processor treats the prefix as a hint to elide the write associated with the lock acquire operation. Even though the lock acquire has an associated write operation to the lock, the processor does not add the address of the lock to the transactional region's write-set nor does it issue any write requests to the lock. Instead, the address of the lock is added to the read-set. The logical processor enters transactional execution. If the lock was available before the XACQUIRE prefixed instruction, then all other processors will continue to see the lock as available afterwards. Since the transactionally executing logical processor neither added the address of the lock to its write-set nor performed externally visible write operations to the lock, other logical processors can read the lock without causing a data conflict. This allows other logical processors to also enter and concurrently execute the critical section protected by the lock. The processor automatically detects any data conflicts that occur during the transactional execution and will perform a transactional abort if necessary.

Even though the eliding processor did not perform any external write operations to the lock, the hardware ensures program order of operations on the lock. If the eliding processor itself reads the value of the lock in the critical section, it will appear as if the processor had acquired the lock, i.e. the read will return the non-elided value. This behavior allows an HLE execution to be functionally equivalent to an execution without the HLE prefixes.

An XRELEASE prefix can be added in front of an instruction that is used to release the lock protecting a critical section. Releasing the lock involves a write to the lock. If the instruction is to restore the value of the lock to the value the lock had prior to the XACQUIRE prefixed lock acquire operation on the same lock, then the processor elides the external write request associated with the release of the lock and does not add the address of the lock to the write-set. The processor then attempts to commit the transactional execution.

With HLE, if multiple threads execute critical sections protected by the same lock but they do not perform any conflicting operations on each other's data, then the threads can execute concurrently and without serialization. Even though the software uses lock acquisition operations on a common lock, the hardware recognizes this, elides the lock, and executes the critical sections on the two threads without requiring any communication through the lock—if such communication was dynamically unnecessary.

If the processor is unable to execute the region transactionally, then the processor will execute the region non-transactionally and without elision. HLE enabled software has the same forward progress guarantees as the underlying non-HLE lock-based execution. For successful HLE execution, the lock and the critical section code must follow certain guidelines. These guidelines only affect performance; and failure to follow these guidelines will not result in a functional failure. Hardware without HLE support will ignore the XACQUIRE and XRELEASE prefix hints and will not perform any elision since these prefixes correspond to the REPNE/REPE IA-32 prefixes which are ignored on the instructions where XACQUIRE and XRELEASE are valid.

Importantly, HLE is compatible with the existing lock-based programming model. Improper use of hints will not cause functional bugs though it may expose latent bugs already in the code.

Restricted Transactional Memory (RTM) provides a flexible software interface for transactional execution. RTM provides three new instructions—XBEGIN, XEND, and XABORT—for programmers to start, commit, and abort a transactional execution.

The programmer uses the XBEGIN instruction to specify the start of a transactional code region and the XEND instruction to specify the end of the transactional code region. If the RTM region could not be successfully executed transactionally, then the XBEGIN instruction takes an operand that provides a relative offset to the fallback instruction address.

A processor may abort RTM transactional execution for many reasons. In many instances, the hardware automatically detects transactional abort conditions and restarts execution from the fallback instruction address with the architectural state corresponding to that present at the start of the XBEGIN instruction and the EAX register updated to describe the abort status.

The XABORT instruction allows programmers to abort the execution of an RTM region explicitly. The XABORT instruction takes an 8-bit immediate argument that is loaded into the EAX register and will thus be available to software following an RTM abort. RTM instructions do not have any data memory location associated with them. While the hardware provides no guarantees as to whether an RTM region will ever successfully commit transactionally, most transactions that follow the recommended guidelines are expected to successfully commit transactionally. However, programmers must always provide an alternative code sequence in the fallback path to guarantee forward progress. This may be as simple as acquiring a lock and executing the specified code region non-transactionally. Further, a transaction that always aborts on a given implementation may complete transactionally on a future implementation. Therefore, programmers must ensure the code paths for the transactional region and the alternative code sequence are functionally tested.

Detection of HLE Support

A processor supports HLE execution if CPUID.07H.EBX.HLE [bit 4]=1. However, an application can use the HLE prefixes (XACQUIRE and XRELEASE) without checking whether the processor supports HLE.

Processors without HLE support ignore these prefixes and will execute the code without entering transactional execution.

Detection of RTM Support

A processor supports RTM execution if CPUID.07H.EBX.RTM [bit 11]=1. An application must check if the processor supports RTM before it uses the RTM instructions (XBEGIN, XEND, XABORT). These instructions will generate a #UD exception when used on a processor that does not support RTM.

Detection of XTEST Instruction

A processor supports the XTEST instruction if it supports either HLE or RTM. An application must check either of these feature flags before using the XTEST instruction. This instruction will generate a #UD exception when used on a processor that does not support either HLE or RTM.

Querying Transactional Execution Status

The XTEST instruction can be used to determine the transactional status of a transactional region specified by HLE or RTM. Note, while the HLE prefixes are ignored on processors that do not support HLE, the XTEST instruction will generate a #UD exception when used on processors that do not support either HLE or RTM.

Requirements for HLE Locks

For HLE execution to successfully commit transactionally, the lock must satisfy certain properties and access to the lock must follow certain guidelines.

An XRELEASE prefixed instruction must restore the value of the elided lock to the value it had before the lock acquisition. This allows hardware to safely elide locks by not adding them to the write-set. The data size and data address of the lock release (XRELEASE prefixed) instruction must match that of the lock acquire (XACQUIRE prefixed) and the lock must not cross a cache line boundary.

Software should not write to the elided lock inside a transactional HLE region with any instruction other than an XRELEASE prefixed instruction, otherwise such a write may cause a transactional abort. In addition, recursive locks (where a thread acquires the same lock multiple times without first releasing the lock) may also cause a transactional abort. Note that software can observe the result of the elided lock acquire inside the critical section. Such a read operation will return the value of the write to the lock.

The processor automatically detects violations to these guidelines, and safely transitions to a non-transactional execution without elision. Since Intel TSX detects conflicts at the granularity of a cache line, writes to data collocated on the same cache line as the elided lock may be detected as data conflicts by other logical processors eliding the same lock.

Transactional Nesting

Both HLE and RTM support nested transactional regions. However, a transactional abort restores state to the operation that started transactional execution: either the outermost XACQUIRE prefixed HLE eligible instruction or the outermost XBEGIN instruction. The processor treats all nested transactions as one transaction.

HLE Nesting and Elision

Programmers can nest HLE regions up to an implementation specific depth of MAX_HLE_NEST_COUNT. Each logical processor tracks the nesting count internally but this count is not available to software. An XACQUIRE prefixed HLE-eligible instruction increments the nesting count, and an XRELEASE prefixed HLE-eligible instruction decrements it. The logical processor enters transactional execution when the nesting count goes from zero to one. The logical processor attempts to commit only when the nesting count becomes zero. A transactional abort may occur if the nesting count exceeds MAX_HLE_NEST_COUNT.

In addition to supporting nested HLE regions, the processor can also elide multiple nested locks. The processor tracks a lock for elision beginning with the XACQUIRE prefixed HLE eligible instruction for that lock and ending with the XRELEASE prefixed HLE eligible instruction for that same lock. The processor can, at any one time, track up to a MAX_HLE_ELIDED_LOCKS number of locks. For example, if the implementation supports a MAX_HLE_ELIDED_LOCKS value of two and if the programmer nests three HLE identified critical sections (by performing XACQUIRE prefixed HLE eligible instructions on three distinct locks without performing an intervening XRELEASE prefixed HLE eligible instruction on any one of the locks), then the first two locks will be elided, but the third won't be elided (but will be added to the transaction's writeset). However, the execution will still continue transactionally. Once an XRELEASE for one of the two elided locks is encountered, a subsequent lock acquired through the XACQUIRE prefixed HLE eligible instruction will be elided.

The processor attempts to commit the HLE execution when all elided XACQUIRE and XRELEASE pairs have been matched, the nesting count goes to zero, and the locks have satisfied requirements. If execution cannot commit atomically, then execution transitions to a non-transactional execution without elision as if the first instruction did not have an XACQUIRE prefix.

RTM Nesting

Programmers can nest RTM regions up to an implementation specific MAX_RTM_NEST_COUNT. The logical processor tracks the nesting count internally but this count is not available to software. An XBEGIN instruction increments the nesting count, and an XEND instruction decrements the nesting count. The logical processor attempts to commit only if the nesting count becomes zero. A transactional abort occurs if the nesting count exceeds MAX_RTM_NEST_COUNT.

Nesting HLE and RTM

HLE and RTM provide two alternative software interfaces to a common transactional execution capability. Transactional processing behavior is implementation specific when HLE and RTM are nested together, e.g., HLE is inside RTM or RTM is inside HLE. However, in all cases, the implementation will maintain HLE and RTM semantics. An implementation may choose to ignore HLE hints when used inside RTM regions, and may cause a transactional abort when RTM instructions are used inside HLE regions. In the latter case, the transition from transactional to non-transactional execution occurs seamlessly since the processor will re-execute the HLE region without actually doing elision, and then execute the RTM instructions.

Abort Status Definition

RTM uses the EAX register to communicate abort status to software. Following an RTM abort the EAX register has the following definition.

TABLE 1

RTM Abort Status Definition

| EAX Register Bit Position | Meaning |
|---|---|
| 0 | Set if abort caused by XABORT instruction |
| 1 | If set, the transaction may succeed on retry, this bit is always clear if bit 0 is set |

TABLE 1-continued

RTM Abort Status Definition

| EAX Register Bit Position | Meaning |
|---|---|
| 2 | Set if another logical processor conflicted with a memory address that was part of the transaction that aborted |
| 3 | Set if an internal buffer overflowed |
| 4 | Set if a debug breakpoint was hit |
| 5 | Set if an abort occurred during execution of a nested transaction |
| 23:6 | Reserved |
| 31-24 | XABORT argument (only valid if bit 0 set, otherwise reserved) |

The EAX abort status for RTM only provides causes for aborts. It does not by itself encode whether an abort or commit occurred for the RTM region. The value of EAX can be 0 following an RTM abort. For example, a CPUID instruction when used inside an RTM region causes a transactional abort and may not satisfy the requirements for setting any of the EAX bits. This may result in an EAX value of 0.

RTM Memory Ordering

A successful RTM commit causes all memory operations in the RTM region to appear to execute atomically. A successfully committed RTM region consisting of an XBEGIN followed by an XEND, even with no memory operations in the RTM region, has the same ordering semantics as a LOCK prefixed instruction.

The XBEGIN instruction does not have fencing semantics. However, if an RTM execution aborts, then all memory updates from within the RTM region are discarded and are not made visible to any other logical processor.

RTM-Enabled Debugger Support

By default, any debug exception inside an RTM region will cause a transactional abort and will redirect control flow to the fallback instruction address with architectural state recovered and bit 4 in EAX set. However, to allow software debuggers to intercept execution on debug exceptions, the RTM architecture provides additional capability.

If bit 11 of DR7 and bit 15 of the IA32_DEBUGCTL_MSR are both 1, any RTM abort due to a debug exception (#DB) or breakpoint exception (#BP) causes execution to roll back and restart from the XBEGIN instruction instead of the fallback address. In this scenario, the EAX register will also be restored back to the point of the XBEGIN instruction.

Programming Considerations

Typical programmer-identified regions are expected to transactionally execute and commit successfully. However, Intel TSX does not provide any such guarantee. A transactional execution may abort for many reasons. To take full advantage of the transactional capabilities, programmers should follow certain guidelines to increase the probability of their transactional execution committing successfully.

This section discusses various events that may cause transactional aborts. The architecture ensures that updates performed within a transaction that subsequently aborts execution will never become visible. Only committed transactional executions initiate an update to the architectural state. Transactional aborts never cause functional failures and only affect performance.

Instruction Based Considerations

Programmers can use any instruction safely inside a transaction (HLE or RTM) and can use transactions at any privilege level. However, some instructions will always abort the transactional execution and cause execution to seamlessly and safely transition to a non-transactional path.

Intel TSX allows for most common instructions to be used inside transactions without causing aborts. The following operations inside a transaction do not typically cause an abort:

Operations on the instruction pointer register, general purpose registers (GPRs) and the status flags (CF, OF, SF, PF, AF, and ZF); and Operations on XMM and YMM registers and the MXCSR register.

However, programmers must be careful when intermixing SSE and AVX operations inside a transactional region. Intermixing SSE instructions accessing XMM registers and AVX instructions accessing YMM registers may cause transactions to abort. Programmers may use REP/REPNE prefixed string operations inside transactions. However, long strings may cause aborts. Further, the use of CLD and STD instructions may cause aborts if they change the value of the DF flag. However, if DF is 1, the STD instruction will not cause an abort. Similarly, if DF is 0, then the CLD instruction will not cause an abort.

Instructions not enumerated here as causing abort when used inside a transaction will typically not cause a transaction to abort (examples include but are not limited to MFENCE, LFENCE, SFENCE, RDTSC, RDTSCP, etc.).

The following instructions will abort transactional execution on any implementation:

XABORT
CPUID
PAUSE

In addition, in some implementations, the following instructions may always cause transactional aborts. These instructions are not expected to be commonly used inside typical transactional regions. However, programmers must not rely on these instructions to force a transactional abort, since whether they cause transactional aborts is implementation dependent.

Operations on X87 and MMX architecture state. This includes all MMX and X87 instructions, including the FXRSTOR and FXSAVE instructions.

Update to non-status portion of EFLAGS: CLI, STI, POPFD, POPFQ, CLTS.

Instructions that update segment registers, debug registers and/or control registers: MOV to DS/ES/FS/GS/SS, POP DS/ES/FS/GS/SS, LDS, LES, LFS, LGS, LSS, SWAPGS, WRFSBASE, WRGSBASE, LGDT, SGDT, LIDT, SIDT, LLDT, SLDT, LTR, STR, Far CALL, Far JMP, Far RET, IRET, MOV to DRx, MOV to CR0/CR2/CR3/CR4/CR8 and LMSW.

Ring transitions: SYSENTER, SYSCALL, SYSEXIT, and SYSRET.

TLB and Cacheability control: CLFLUSH, INVD, WBINVD, INVLPG, INVPCID, and memory instructions with a non-temporal hint (MOVNTDQA, MOVNTDQ, MOVNTI, MOVNTPD, MOVNTPS, and MOVNTQ).

Processor state save: XSAVE, XSAVEOPT, and XRSTOR.

Interrupts: INTn, INTO.

IO: IN, INS, REP INS, OUT, OUTS, REP OUTS and their variants.

VMX: VMPTRLD, VMPTRST, VMCLEAR, VMREAD, VMWRITE, VMCALL, VMLAUNCH, VMRESUME, VMXOFF, VMXON, INVEPT, and INVVPID.

SMX: GETSEC.
UD2, RSM, RDMSR, WRMSR, HLT, MONITOR, MWAIT, XSETBV, VZEROUPPER, MASKMOVQ, and V/MASKMOVDQU.

Runtime Considerations

In addition to the instruction-based considerations, runtime events may cause transactional execution to abort. These may be due to data access patterns or micro-architectural implementation features. The following list is not a comprehensive discussion of all abort causes.

Any fault or trap in a transaction that must be exposed to software will be suppressed. Transactional execution will abort and execution will transition to a non-transactional execution, as if the fault or trap had never occurred. If an exception is not masked, then that un-masked exception will result in a transactional abort and the state will appear as if the exception had never occurred.

Synchronous exception events (#DE, #OF, #NP, #SS, #GP, #BR, #UD, #AC, #XF, #PF, #NM, #TS, #MF, #DB, #BP/INT3) that occur during transactional execution may cause an execution not to commit transactionally, and require a non-transactional execution. These events are suppressed as if they had never occurred. With HLE, since the non-transactional code path is identical to the transactional code path, these events will typically re-appear when the instruction that caused the exception is re-executed non-transactionally, causing the associated synchronous events to be delivered appropriately in the non-transactional execution. Asynchronous events (NMI, SMI, INTR, IPI, PMI, etc.) occurring during transactional execution may cause the transactional execution to abort and transition to a non-transactional execution. The asynchronous events will be pended and handled after the transactional abort is processed.

Transactions only support write-back cacheable memory type operations. A transaction may always abort if the transaction includes operations on any other memory type. This includes instruction fetches to UC memory type.

Memory accesses within a transactional region may require the processor to set the Accessed and Dirty flags of the referenced page table entry. The behavior of how the processor handles this is implementation specific. Some implementations may allow the updates to these flags to become externally visible even if the transactional region subsequently aborts. Some Intel TSX implementations may choose to abort the transactional execution if these flags need to be updated. Further, a processor's page-table walk may generate accesses to its own transactionally written but uncommitted state. Some Intel TSX implementations may choose to abort the execution of a transactional region in such situations. Regardless, the architecture ensures that, if the transactional region aborts, then the transactionally written state will not be made architecturally visible through the behavior of structures such as TLBs.

Executing self-modifying code transactionally may also cause transactional aborts. Programmers must continue to follow the Intel recommended guidelines for writing self-modifying and cross-modifying code even when employing HLE and RTM. While an implementation of RTM and HLE will typically provide sufficient resources for executing common transactional regions, implementation constraints and excessive sizes for transactional regions may cause a transactional execution to abort and transition to a non-transactional execution. The architecture provides no guarantee of the amount of resources available to do transactional execution and does not guarantee that a transactional execution will ever succeed.

Conflicting requests to a cache line accessed within a transactional region may prevent the transaction from executing successfully. For example, if logical processor P0 reads line A in a transactional region and another logical processor P1 writes line A (either inside or outside a transactional region) then logical processor P0 may abort if logical processor P1's write interferes with processor P0's ability to execute transactionally.

Similarly, if P0 writes line A in a transactional region and P1 reads or writes line A (either inside or outside a transactional region), then P0 may abort if P1's access to line A interferes with P0's ability to execute transactionally. In addition, other coherence traffic may at times appear as conflicting requests and may cause aborts. While these false conflicts may happen, they are expected to be uncommon. The conflict resolution policy to determine whether P0 or P1 aborts in the above scenarios is implementation specific.

Generic Transaction Execution embodiments:

According to "ARCHITECTURES FOR TRANSACTIONAL MEMORY", a dissertation submitted to the Department of Computer Science and the Committee on Graduate Studies of Stanford University in partial fulfillment of the requirements for the Degree of Doctor of Philosophy, by Austen McDonald, June 2009, incorporated by reference herein in its entirety, fundamentally, there are three mechanisms needed to implement an atomic and isolated transactional region: versioning, conflict detection, and contention management.

To make a transactional code region appear atomic, all the modifications performed by that transactional code region must be stored and kept isolated from other transactions until commit time. The system does this by implementing a versioning policy. Two versioning paradigms exist: eager and lazy. An eager versioning system stores newly generated transactional values in place and stores previous memory values on the side, in what is called an undo-log. A lazy versioning system stores new values temporarily in what is called a write buffer, copying them to memory only on commit. In either system, the cache is used to optimize storage of new versions.

To ensure that transactions appear to be performed atomically, conflicts must be detected and resolved. The two systems, i.e., the eager and lazy versioning systems, detect conflicts by implementing a conflict detection policy, either optimistic or pessimistic. An optimistic system executes transactions in parallel, checking for conflicts only when a transaction commits. A pessimistic system checks for conflicts at each load and store. Similar to versioning, conflict detection also uses the cache, marking each line as either part of the read-set, part of the write-set, or both. The two systems resolve conflicts by implementing a contention management policy. Many contention management policies exist, some are more appropriate for optimistic conflict detection and some are more appropriate for pessimistic. Described below are some example policies.

Since each transactional memory (TM) system needs both versioning detection and conflict detection, these options give rise to four distinct TM designs: Eager-Pessimistic (EP), Eager-Optimistic (EO), Lazy-Pessimistic (LP), and Lazy-Optimistic (LO). Table 2 briefly describes all four distinct TM designs.

Figure 2:
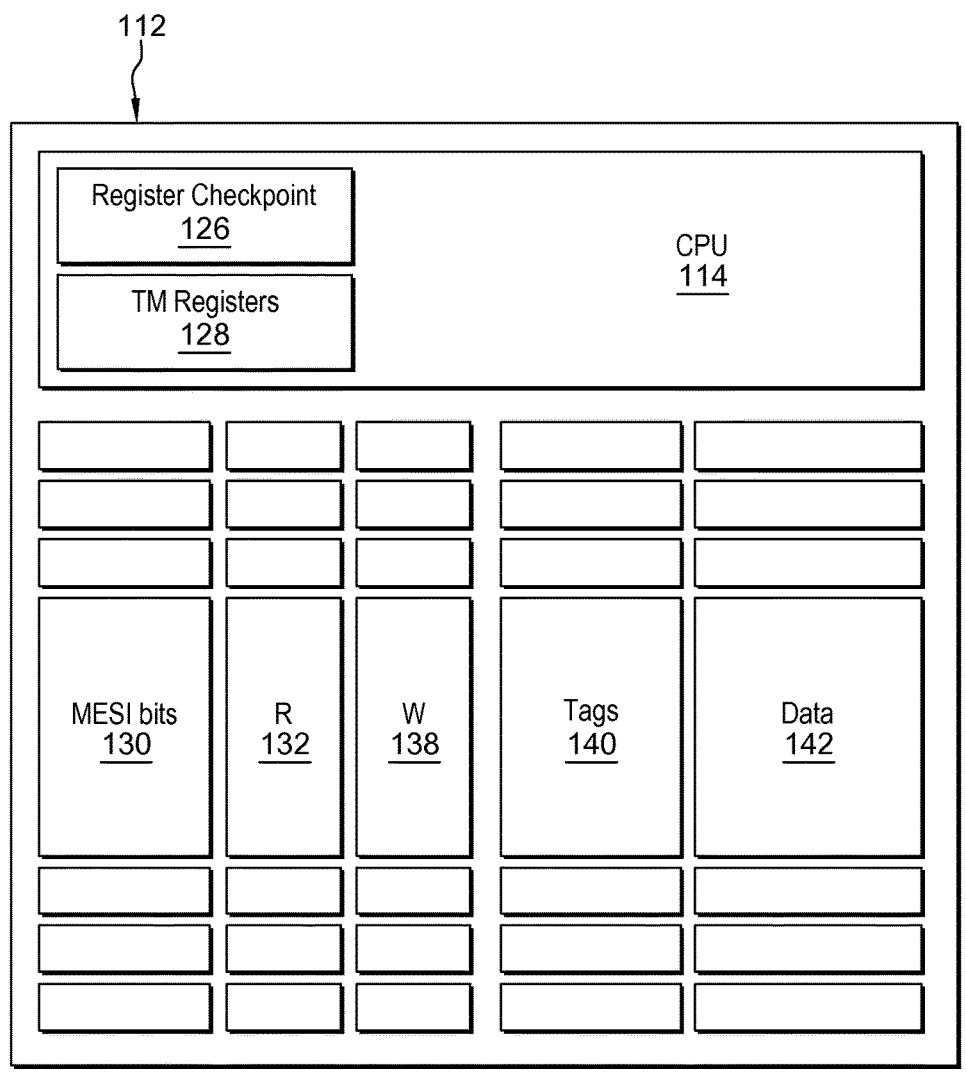
FIG. 2 depicts an example multicore transactional memory environment, in accordance with an illustrative embodiment.

FIGS. 1 and 2 depict an example of a multicore TM environment. FIG. 1 shows many TM-enabled CPUs (CPU1 114*a*, CPU2 114*b*, etc.) on one die 100, connected with an interconnect 122, under management of an interconnect control 120*a*, 120*b*. Each CPU 114*a*, 114*b* (also known as a Processor) may have a split cache consisting of an Instruction Cache 116*a*, 116*b* for caching instructions from memory to be executed and a Data Cache 118*a*, 118*b* with TM support for caching data (operands) of memory locations to be operated on by CPU 114*a*, 114*b* (in FIG. 1, each CPU 114*a*, 114*b* and its associated caches are referenced as 112*a*, 112*b*). In an implementation, caches of multiple dies 100 are interconnected to support cache coherency between the caches of the multiple dies 100. In an implementation, a single cache, rather than the split cache is employed holding both instructions and data. In implementations, the CPU caches are one level of caching in a hierarchical cache structure. For example each die 100 may employ a shared cache 124 to be shared amongst all the CPUs on the die 100. In another implementation, each die may have access to a shared cache 124, shared amongst all the processors of all the dies 100.

FIG. 2 shows the details of an example transactional CPU environment 112, having a CPU 114, including additions to support TM. The transactional CPU (processor) 114 may include hardware for supporting Register Checkpoints 126 and special TM Registers 128. The transactional CPU cache may have the MESI bits 130, Tags 140 and Data 142 of a conventional cache but also, for example, R bits 132 showing a line has been read by the CPU 114 while executing a transaction and W bits 138 showing a line has been written-to by the CPU 114 while executing a transaction.

A key detail for programmers in any TM system is how non-transactional accesses interact with transactions. By design, transactional accesses are screened from each other using the mechanisms above. However, the interaction between a regular, non-transactional load with a transaction containing a new value for that address must still be considered. In addition, the interaction between a non-transactional store with a transaction that has read that address must also be explored. These are issues of the database concept isolation.

A TM system is said to implement strong isolation, sometimes called strong atomicity, when every non-transactional load and store acts like an atomic transaction. Therefore, non-transactional loads cannot see uncommitted data and non-transactional stores cause atomicity violations in any transactions that have read that address. A system where this is not the case is said to implement weak isolation, sometimes called weak atomicity.

Strong isolation is often more desirable than weak isolation due to the relative ease of conceptualization and implementation of strong isolation. Additionally, if a programmer has forgotten to surround some shared memory references with transactions, causing bugs, then with strong isolation, the programmer will often detect that oversight using a simple debug interface because the programmer will see a non-transactional region causing atomicity violations. Also, programs written in one model may work differently on another model. Further, strong isolation is often easier to support in hardware TM than weak isolation. With strong isolation, since the coherence protocol already manages load and store communication between processors, transactions can detect non-transactional loads and stores and act appropriately. To implement strong isolation in software Transactional Memory (TM), non-transactional code must be modified to include read- and write-barriers; potentially crippling performance. Although great effort has been expended to remove many un-needed barriers, such techniques are often complex and performance is typically far lower than that of HTMs.

TABLE 2

Transactional Memory Design Space

| | | VERSIONING | |
|---|---|---|---|
| | | Lazy | Eager |
| CONFLICT DETECTION | Optimistic | Storing updates in a write buffer; detecting conflicts at commit time. | Not practical: waiting to update memory until commit time but detecting conflicts at access time guarantees wasted work and provides no advantage |
| | Pessimistic | Storing updates in a writebuffer; detecting conflicts at access time. | Updating memory, keeping old values in undo log; detecting conflicts at access time. |

Table 2 illustrates the fundamental design space of transactional memory (versioning and conflict detection).

Eager-Pessimistic (EP)

This first TM design described below is known as Eager-Pessimistic. An EP system stores its write-set "in place" (hence the name "eager") and, to support rollback, stores the old values of overwritten lines in an "undo log". Processors use the W 138 and R 132 cache bits to track read and write-sets and detect conflicts when receiving snooped load requests. Perhaps the most notable examples of EP systems in known literature are Log TM and UTM.

Beginning a transaction in an EP system is much like beginning a transaction in other systems: tm_begin( ) takes a register checkpoint, and initializes any status registers. An EP system also requires initializing the undo log, the details of which are dependent on the log format, but often involve initializing a log base pointer to a region of pre-allocated, thread-private memory, and clearing a log bounds register.

Versioning: In EP, due to the way eager versioning is designed to function, the MESI bits 130 state transitions (cache line indicators corresponding to Modified, Exclusive, Shared, and Invalid code states) are left mostly unchanged. Outside of a transaction, the MESI bits 130 state transitions are left completely unchanged. When reading a line inside a transaction, the standard coherence transitions apply (S (Shared)→S, I (Invalid)→S, or I→E (Exclusive)), issuing a load miss as needed, but the R 132 bit is also set. Likewise, writing a line applies the standard transitions (S→M, E→I, I→M), issuing a miss as needed, but also sets the W 138 (Written) bit. The first time a line is written, the old version of the entire line is loaded then written to the undo log to preserve it in case the current transaction aborts. The newly written data is then stored "in-place," over the old data.

Conflict Detection: Pessimistic conflict detection uses coherence messages exchanged on misses, or upgrades, to look for conflicts between transactions. When a read miss occurs within a transaction, other processors receive a load request; but they ignore the request if they do not have the needed line. If the other processors have the needed line non-speculatively or have the line R 132 (Read), they downgrade that line to S, and in certain cases issue a cache-to-cache transfer if they have the line in MESI's bits 130 M or E state. However, if the cache has the line W 138, then a conflict is detected between the two transactions and additional action(s) must be taken.

Similarly, when a transaction seeks to upgrade a line from shared to modified (on a first write), the transaction issues an exclusive load request, which is also used to detect conflicts. If a receiving cache has the line non-speculatively, then the line is invalidated, and in certain cases a cache-to-cache transfer (M or E states) is issued. But, if the line is R 132 or W 138, a conflict is detected.

Validation: Because conflict detection is performed on every load, a transaction always has exclusive access to its own write-set. Therefore, validation does not require any additional work.

Commit: Since eager versioning stores the new version of data items in place, the commit process simply clears the W 138 and R 132 bits and discards the undo log.

Abort: When a transaction rolls back, the original version of each cache line in the undo log must be restored, a process called "unrolling" or "applying" the log. This is done during tm_discard( ) and must be atomic with regard to other transactions. Specifically, the write-set must still be used to detect conflicts: this transaction has the only correct version of lines in its undo log, and requesting transactions must wait for the correct version to be restored from that log. Such a log can be applied using a hardware state machine or software abort handler.

Eager-Pessimistic has the characteristics of: Commit is simple and since it is in-place, very fast. Similarly, validation is a no-op. Pessimistic conflict detection detects conflicts early, thereby reducing the number of "doomed" transactions. For example, if two transactions are involved in a Write-After-Read dependency, then that dependency is detected immediately in pessimistic conflict detection. However, in optimistic conflict detection such conflicts are not detected until the writer commits.

Eager-Pessimistic also has the characteristics of: As described above, the first time a cache line is written, the old value must be written to the log, incurring extra cache accesses. Aborts are expensive as they require undoing the log. For each cache line in the log, a load must be issued, perhaps going as far as main memory before continuing to the next line. Pessimistic conflict detection also prevents certain serializable schedules from existing.

Additionally, because conflicts are handled as they occur, there is a potential for livelock and careful contention management mechanisms must be employed to guarantee forward progress.

Lazy-Optimistic (LO)

Another popular TM design is Lazy-Optimistic (LO), which stores its write-set in a "write buffer" or "redo log" and detects conflicts at commit time (still using the R 132 and W 138 bits).

Versioning: Just as in the EP system, the MESI protocol of the LO design is enforced outside of the transactions. Once inside a transaction, reading a line incurs the standard MESI transitions but also sets the R 132 bit. Likewise, writing a line sets the W 138 bit of the line, but handling the MESI transitions of the LO design is different from that of the EP design. First, with lazy versioning, the new versions of written data are stored in the cache hierarchy until commit while other transactions have access to old versions available in memory or other caches. To make available the old versions, dirty lines (M lines) must be evicted when first written by a transaction. Second, no upgrade misses are needed because of the optimistic conflict detection feature: if a transaction has a line in the S state, it can simply write to it and upgrade that line to an M state without communicating the changes with other transactions because conflict detection is done at commit time.

Conflict Detection and Validation: To validate a transaction and detect conflicts, LO communicates the addresses of speculatively modified lines to other transactions only when it is preparing to commit. On validation, the processor sends one, potentially large, network packet containing all the addresses in the write-set. Data is not sent, but left in the cache of the committer and marked dirty (M). To build this packet without searching the cache for lines marked W, a simple bit vector is used, called a "store buffer," with one bit per cache line to track these speculatively modified lines. Other transactions use this address packet to detect conflicts: if an address is found in the cache and the R 132 and/or W 138 bits are set, then a conflict is initiated. If the line is found but neither R 132 nor W 138 is set, then the line is simply invalidated, which is similar to processing an exclusive load.

To support transaction atomicity, these address packets must be handled atomically, i.e., no two address packets may exist at once with the same addresses. In an LO system, this can be achieved by simply acquiring a global commit token before sending the address packet. However, a two-phase commit scheme could be employed by first sending out the address packet, collecting responses, enforcing an ordering protocol (perhaps oldest transaction first), and committing once all responses are satisfactory.

Commit: Once validation has occurred, commit needs no special treatment: simply clear W 138 and R 132 bits and the store buffer. The transaction's writes are already marked dirty in the cache and other caches' copies of these lines have been invalidated via the address packet. Other processors can then access the committed data through the regular coherence protocol.

Abort: Rollback is equally easy: because the write-set is contained within the local caches, these lines can be invalidated, then clear W 138 and R 132 bits and the store buffer. The store buffer allows W lines to be found to invalidate without the need to search the cache.

Lazy-Optimistic has the characteristics of: Aborts are very fast, requiring no additional loads or stores and making only local changes. More serializable schedules can exist than found in EP, which allows an LO system to more aggressively speculate that transactions are independent, which can yield higher performance. Finally, the late detection of conflicts can increase the likelihood of forward progress.

Lazy-Optimistic also has the characteristics of: Validation takes global communication time proportional to size of write set. Doomed transactions can waste work since conflicts are detected only at commit time.

Lazy-Pessimistic (LP)

Lazy-Pessimistic (LP) represents a third TM design option, sitting somewhere between EP and LO: storing newly written lines in a write buffer but detecting conflicts on a per access basis.

Versioning: Versioning is similar but not identical to that of LO: reading a line sets its R bit 132, writing a line sets its W bit 138, and a store buffer is used to track W lines in the cache. Also, dirty (M) lines must be evicted when first written by a transaction, just as in LO. However, since conflict detection is pessimistic, load exclusives must be performed when upgrading a transactional line from I, S→M, which is unlike LO.

Conflict Detection: LP's conflict detection operates the same as EP's: using coherence messages to look for conflicts between transactions.

Validation: Like in EP, pessimistic conflict detection ensures that at any point, a running transaction has no conflicts with any other running transaction, so validation is a no-op.

Commit: Commit needs no special treatment: simply clear W 138 and R 132 bits and the store buffer, like in LO.

Abort: Rollback is also like that of LO: simply invalidate the write-set using the store buffer and clear the W and R bits and the store buffer.

Eager-Optimistic (EO)

The LP has the characteristics of: Like LO, aborts are very fast. Like EP, the use of pessimistic conflict detection reduces the number of "doomed" transactions. Like EP, some serializable schedules are not allowed and conflict detection must be performed on each cache miss.

The final combination of versioning and conflict detection is Eager-Optimistic (EO). EO may be a less than optimal choice for HTM systems: since new transactional versions are written in-place, other transactions have no choice but to notice conflicts as they occur (i.e., as cache misses occur). But since EO waits until commit time to detect conflicts, those transactions become "zombies," continuing to execute, wasting resources, yet are "doomed" to abort.

EO has proven to be useful in STMs and is implemented by Bartok-STM and McRT. A lazy versioning STM needs to check its write buffer on each read to ensure that it is reading the most recent value. Since the write buffer is not a hardware structure, this is expensive, hence the preference for write-in-place eager versioning. Additionally, since checking for conflicts is also expensive in an STM, optimistic conflict detection offers the advantage of performing this operation in bulk.

Contention Management

How a transaction rolls back once the system has decided to abort that transaction has been described above, but, since a conflict involves two transactions, the topics of which transaction should abort, how that abort should be initiated, and when should the aborted transaction be retried need to be explored. These are topics that are addressed by Contention Management (CM), a key component of transactional memory. Described below are policies regarding how the systems initiate aborts and the various established methods of managing which transactions should abort in a conflict.

Contention Management Policies

A Contention Management (CM) Policy is a mechanism that determines which transaction involved in a conflict should abort and when the aborted transaction should be retried. For example, it is often the case that retrying an aborted transaction immediately does not lead to the best performance. Conversely, employing a back-off mechanism, which delays the retrying of an aborted transaction, can yield better performance. STMs first grappled with finding the best contention management policies and many of the policies outlined below were originally developed for STMs.

CM Policies draw on a number of measures to make decisions, including ages of the transactions, size of read- and write-sets, the number of previous aborts, etc. The combinations of measures to make such decisions are endless, but certain combinations are described below, roughly in order of increasing complexity.

To establish some nomenclature, first note that in a conflict there are two sides: the attacker and the defender. The attacker is the transaction requesting access to a shared memory location. In pessimistic conflict detection, the attacker is the transaction issuing the load or load exclusive. In optimistic, the attacker is the transaction attempting to validate. The defender in both cases is the transaction receiving the attacker's request.

An Aggressive CM Policy immediately and always retries either the attacker or the defender. In LO, Aggressive means that the attacker always wins, and so Aggressive is sometimes called committer wins. Such a policy was used for the earliest LO systems. In the case of EP, Aggressive can be either defender wins or attacker wins.

Restarting a conflicting transaction that will immediately experience another conflict is bound to waste work—namely interconnect bandwidth refilling cache misses. A Polite CM Policy employs exponential backoff (but linear could also be used) before restarting conflicts. To prevent starvation, a situation where a process does not have resources allocated to it by the scheduler, the exponential backoff greatly increases the odds of transaction success after some n retries.

Another approach to conflict resolution is to randomly abort the attacker or defender (a policy called Randomized). Such a policy may be combined with a randomized backoff scheme to avoid unneeded contention.

However, making random choices, when selecting a transaction to abort, can result in aborting transactions that have completed "a lot of work", which can waste resources. To avoid such waste, the amount of work completed on the transaction can be taken into account when determining which transaction to abort. One measure of work could be a transaction's age. Other methods include Oldest, Bulk TM, Size Matters, Karma, and Polka. Oldest is a simple timestamp method that aborts the younger transaction in a conflict. Bulk TM uses this scheme. Size Matters is like Oldest but instead of transaction age, the number of read/written words is used as the priority, reverting to Oldest after a fixed number of aborts. Karma is similar, using the size of the write-set as priority. Rollback then proceeds after backing off a fixed amount of time. Aborted transactions keep their priorities after being aborted (hence the name Karma). Polka works like Karma but instead of backing off a predefined amount of time, it backs off exponentially more each time.

Since aborting wastes work, it is logical to argue that stalling an attacker until the defender has finished their transaction would lead to better performance. Unfortunately, such a simple scheme easily leads to deadlock.

Deadlock avoidance techniques can be used to solve this problem. Greedy uses two rules to avoid deadlock. The first rule is, if a first transaction, T1, has lower priority than a second transaction, T0, or if T1 is waiting for another transaction, then T1 aborts when conflicting with T0. The second rule is, if T1 has higher priority than T0 and is not waiting, then T0 waits until T1 commits, aborts, or starts waiting (in which case the first rule is applied). Greedy provides some guarantees about time bounds for executing a set of transactions. One EP design (Log TM) uses a CM policy similar to Greedy to achieve stalling with conservative deadlock avoidance.

Example MESI coherency rules provide for four possible states in which a cache line of a multiprocessor cache system may reside, M, E, S, and I, defined as follows:

Modified (M): The cache line is present only in the current cache, and is dirty; it has been modified from the value in main memory. The cache is required to write the data back to main memory at some time in the future, before permitting any other read of the (no longer valid) main memory state. The write-back changes the line to the Exclusive state.

Exclusive (E): The cache line is present only in the current cache, but is clean; it matches main memory. It may be changed to the Shared state at any time, in response to a read request. Alternatively, it may be changed to the Modified state when writing to it.

Shared (S): Indicates that this cache line may be stored in other caches of the machine and is "clean"; it matches the main memory. The line may be discarded (changed to the Invalid state) at any time.

Invalid (I): Indicates that this cache line is invalid (unused).

TM coherency status indicators (R 132, W 138) may be provided for each cache line, in addition to, or encoded in the MESI coherency bits. An R 132 indicator indicates the current transaction has read from the data of the cache line, and a W 138 indicator indicates the current transaction has written to the data of the cache line.

In another aspect of TM design, a system is designed using transactional store buffers. U.S. Pat. No. 6,349,361 titled "Methods and Apparatus for Reordering and Renaming Memory References in a Multiprocessor Computer System," filed Mar. 31, 2000 and incorporated by reference herein in its entirety, teaches a method for reordering and renaming memory references in a multiprocessor computer system having at least a first and a second processor. The first processor has a first private cache and a first buffer, and the second processor has a second private cache and a second buffer. The method includes the steps of, for each of a plurality of gated store requests received by the first processor to store a datum, exclusively acquiring a cache line that contains the datum by the first private cache, and storing the datum in the first buffer. Upon the first buffer receiving a load request from the first processor to load a particular datum, the particular datum is provided to the first processor from among the data stored in the first buffer based on an in-order sequence of load and store operations. Upon the first cache receiving a load request from the second cache for a given datum, an error condition is indicated and a current state of at least one of the processors is reset to an earlier state when the load request for the given datum corresponds to the data stored in the first buffer.

The main implementation components of one such transactional memory facility are a transaction-backup register file for holding pre-transaction GR (general register) content, a cache directory to track the cache lines accessed during the transaction, a store cache to buffer stores until the transaction ends, and firmware routines to perform various complex functions. In this section a detailed implementation is described.

IBM zEnterprise EC12 Enterprise Server Embodiment

The IBM zEnterprise EC12 enterprise server introduces transactional execution (TX) in transactional memory, and is described in part in a paper, "Transactional Memory Architecture and Implementation for IBM System z" of Proceedings Pages 25-36 presented at MICRO-45, 1-5 Dec. 2012, Vancouver, British Columbia, Canada, available from IEEE Computer Society Conference Publishing Services (CPS), which is incorporated by reference herein in its entirety.

Table 3 shows an example transaction. Transactions started with TBEGIN are not assured to ever successfully complete with TEND, since they can experience an aborting condition at every attempted execution, e.g., due to repeating conflicts with other CPUs. This requires that the program support a fallback path to perform the same operation non-transactionally, e.g., by using traditional locking schemes. This puts significant burden on the programming and software verification teams, especially where the fallback path is not automatically generated by a reliable compiler.

TABLE 3

Example Transaction Code

| | LHI | R0,0 | *initialize retry count=0 |
|---|---|---|---|
| loop | TBEGIN | | *begin transaction |
| | JNZ | abort | *go to abort code if CC1=0 |
| | LT | R1, lock | *load and test the fallback lock |

TABLE 3-continued

Example Transaction Code

| | JNZ | lckbzy | *branch if lock busy |
|---|---|---|---|
| | ... perform operation ... | | |
| | TEND | | *end transaction |
| | ... ... | ... ... | |
| lckbzy | TABORT | | *abort if lock busy; this |
| | | | *resumes after TBEGIN |
| abort | JO | fallback | *no retry if CC=3 |
| | AHI | R0, 1 | *increment retry count |
| | CIJNL | R0,6, fallback | *give up after 6 attempts |
| | PPA | R0, TX | *random delay based on retry count |
| | ... potentially wait for lock to become free ... | | |
| | J | loop | *jump back to retry fallback |
| | OBTAIN | lock | *using Compare&Swap |
| | ... perform operation ... | | |
| | RELEASE | lock | |
| | ... ... | ... ... | |

The requirement of providing a fallback path for aborted Transaction Execution (TX) transactions can be onerous. Many transactions operating on shared data structures are expected to be short, touch only a few distinct memory locations, and use simple instructions only. For those transactions, the IBM zEnterprise EC12 introduces the concept of constrained transactions; under normal conditions, the CPU 114 (FIG. 1) assures that constrained transactions eventually end successfully, albeit without giving a strict limit on the number of necessary retries. A constrained transaction starts with a TBEGINC instruction and ends with a regular TEND. Implementing a task as a constrained or non-constrained transaction typically results in very comparable performance, but constrained transactions simplify software development by removing the need for a fallback path. IBM's Transactional Execution architecture is further described in z/Architecture, Principles of Operation, Tenth Edition, SA22-7832-09 published September 2012 from IBM, incorporated by reference herein in its entirety.

A constrained transaction starts with the TBEGINC instruction. A transaction initiated with TBEGINC must follow a list of programming constraints; otherwise the program takes a non-filterable constraint-violation interruption. Exemplary constraints may include, but not be limited to: the transaction can execute a maximum of 32 instructions, all instruction text must be within 256 consecutive bytes of memory; the transaction contains only forward-pointing relative branches (i.e., no loops or subroutine calls); the transaction can access a maximum of 4 aligned octowords (an octoword is 32 bytes) of memory; and restriction of the instruction-set to exclude complex instructions like decimal or floating-point operations. The constraints are chosen such that many common operations like doubly linked list-insert/delete operations can be performed, including the very powerful concept of atomic compare-and-swap targeting up to 4 aligned octowords. At the same time, the constraints were chosen conservatively such that future CPU implementations can assure transaction success without needing to adjust the constraints, since that would otherwise lead to software incompatibility.

TBEGINC mostly behaves like XBEGIN in TSX or TBEGIN on IBM's zEC12 servers, except that the floating-point register (FPR) control and the program interruption filtering fields do not exist and the controls are considered to be zero. On a transaction abort, the instruction address is set back directly to the TBEGINC instead of to the instruction after, reflecting the immediate retry and absence of an abort path for constrained transactions.

Nested transactions are not allowed within constrained transactions, but if a TBEGINC occurs within a non-constrained transaction it is treated as opening a new non-constrained nesting level just like TBEGIN would. This can occur, e.g., if a non-constrained transaction calls a subroutine that uses a constrained transaction internally. Since interruption filtering is implicitly off, all exceptions during a constrained transaction lead to an interruption into the operating system (OS). Eventual successful finishing of the transaction relies on the capability of the OS to page-in the at most 4 pages touched by any constrained transaction. The OS must also ensure time-slices long enough to allow the transaction to complete.

TABLE 4

Transaction Code Example

| | |
|---|---|
| TBEGINC | *begin constrained transaction |
| ... perform operation ... | |
| TEND | *end transaction |

Table 4 shows the constrained-transactional implementation of the code in Table 3, assuming that the constrained transactions do not interact with other locking-based code. No lock testing is shown therefore, but could be added if constrained transactions and lock-based code were mixed.

When failure occurs repeatedly, software emulation is performed using millicode as part of system firmware. Advantageously, constrained transactions have desirable properties because of the burden removed from programmers.

Figure 3:
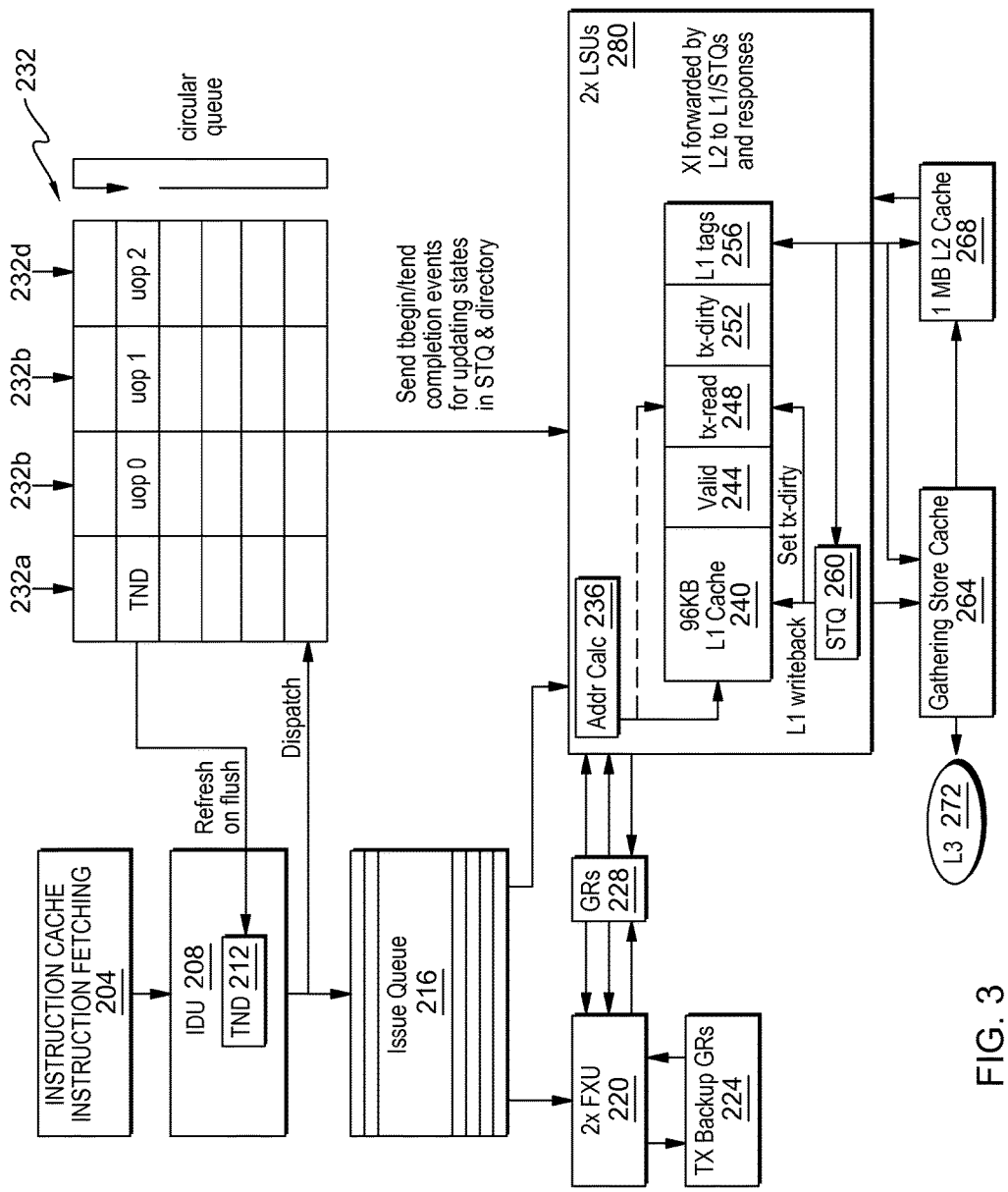
FIG. 3 depicts example components of an example CPU, in accordance with an illustrative embodiment.

With reference to FIG. 3, the IBM zEnterprise EC12 processor introduced the transactional execution facility. The processor can decode 3 instructions per clock cycle; simple instructions are dispatched as single micro-ops, and more complex instructions are cracked into multiple micro-ops. The micro-ops (Uops 232b) are written into a unified issue queue 216, from where they can be issued out-of-order. Up to two fixed-point, one floating-point, two load/store, and two branch instructions can execute every cycle. A Global Completion Table (GCT) 232 holds every micro-op 232b and a transaction nesting depth (TND) 232a. The GCT 232 is written in-order at decode time, tracks the execution status of each micro-op 232b, and completes instructions when all micro-ops 232b of the oldest instruction group have successfully executed.

The level 1 (L1) data cache 240 is a 96 KB (kilo-byte) 6-way associative cache with 256 byte cache-lines and 4 cycle use latency, coupled to a private 1 MB (mega-byte) 8-way associative 2nd-level (L2) data cache 268 with 7 cycles use-latency penalty for L1 240 misses. The L1 240 cache is the cache closest to a processor and Ln cache is a cache at the nth level of caching. Both L1 240 and L2 268 caches are store-through. Six cores on each central processor (CP) chip share a 48 MB 3rd-level store-in cache, and six CP chips are connected to an off-chip 384 MB 4th-level cache, packaged together on a glass ceramic multi-chip module (MCM). Up to 4 multi-chip modules (MCMs) can be connected to a coherent symmetric multi-processor (SMP) system with up to 144 cores (not all cores are available to run customer workload).

Coherency is managed with a variant of the MESI protocol. Cache-lines can be owned read-only (shared) or exclusive; the L1 240 and L2 268 are store-through and thus do not contain dirty lines. The L3 272 and L4 caches (not shown) are store-in and track dirty states. Each cache is inclusive of all its connected lower level caches.

Coherency requests are called "cross interrogates" (XI) and are sent hierarchically from higher level to lower-level caches, and between the L4s. When one core misses the L1 240 and L2 268 and requests the cache line from its local L3 272, the L3 272 checks whether it owns the line, and if necessary sends an XI to the currently owning L2 268/L1 240 under that L3 272 to ensure coherency, before it returns the cache line to the requestor. If the request also misses the L3 272, the L3 272 sends a request to the L4 (not shown), which enforces coherency by sending XIs to all necessary L3s under that L4, and to the neighboring L4s. Then the L4 responds to the requesting L3 which forwards the response to the L2 268/L1 240.

Note that due to the inclusivity rule of the cache hierarchy, sometimes cache lines are XI'ed from lower-level caches due to evictions on higher-level caches caused by associativity overflows from requests to other cache lines. These XIs can be called "LRU XIs", where LRU stands for least recently used.

Making reference to yet another type of XI requests, Demote-XIs transition cache-ownership from exclusive into read-only state, and Exclusive-XIs transition cache ownership from exclusive into invalid state. Demote-XIs and Exclusive-XIs need a response back to the XI sender. The target cache can "accept" the XI, or send a "reject" response if it first needs to evict dirty data before accepting the XI. The L1 240/L2 268 caches are store through, but may reject demote-XIs and exclusive XIs if they have stores in their store queues that need to be sent to L3 before downgrading the exclusive state. A rejected XI will be repeated by the sender. Read-only-XIs are sent to caches that own the line read-only; no response is needed for such XIs since they cannot be rejected. The details of the SMP protocol are similar to those described for the IBM z10 by P. Mak, C. Walters, and G. Strait, in "IBM System z10 processor cache subsystem microarchitecture", IBM Journal of Research and Development, Vol 53:1, 2009, which is incorporated by reference herein in its entirety.

Transactional Instruction Execution

FIG. 3 depicts example components of an example transactional execution environment, including a CPU and caches/components with which it interacts (such as those depicted in FIGS. 1 and 2). The instruction decode unit 208 (IDU) keeps track of the current transaction nesting depth 212 (TND). When the IDU 208 receives a TBEGIN instruction, the nesting depth 212 is incremented, and conversely decremented on TEND instructions. The nesting depth 212 is written into the GCT 232 for every dispatched instruction. When a TBEGIN or TEND is decoded on a speculative path that later gets flushed, the IDU's 208 nesting depth 212 is refreshed from the youngest GCT 232 entry that is not flushed. The transactional state is also written into the issue queue 216 for consumption by the execution units, mostly by the Load/Store Unit (LSU) 280, which also has an effective address calculator 236 is included in the LSU 280. The TBEGIN instruction may specify a transaction diagnostic block (TDB) for recording status information, should the transaction abort before reaching a TEND instruction.

Similar to the nesting depth, the IDU 208/GCT 232 collaboratively track the access register/floating-point register (AR/FPR) modification masks through the transaction nest; the IDU 208 can place an abort request into the GCT 232 when an AR/FPR-modifying instruction is decoded and the modification mask blocks that. When the instruction becomes next-to-complete, completion is blocked and the transaction aborts. Other restricted instructions are handled similarly, including TBEGIN if decoded while in a constrained transaction, or exceeding the maximum nesting depth.

An outermost TBEGIN is cracked into multiple micro-ops depending on the GR-Save-Mask; each micro-op 232b (including, for example uop 0, uop 1, and uop2) will be executed by one of the two fixed point units (FXUs) 220 to save a pair of GRs 228 into a special transaction-backup register file 224, that is used to later restore the GR 228 content in case of a transaction abort. Also the TBEGIN spawns micro-op s 232b to perform an accessibility test for the TDB if one is specified; the address is saved in a special purpose register for later usage in the abort case. At the decoding of an outermost TBEGIN, the instruction address and the instruction text of the TBEGIN are also saved in special purpose registers for a potential abort processing later on.

TEND and NTSTG are single micro-op 232b instructions; NTSTG (non-transactional store) is handled like a normal store except that it is marked as non-transactional in the issue queue 216 so that the LSU 280 can treat it appropriately. TEND is a no-op at execution time, the ending of the transaction is performed when TEND completes.

As mentioned, instructions that are within a transaction are marked as such in the issue queue 216, but otherwise execute mostly unchanged; the LSU 280 performs isolation tracking as described in the next section.

Since decoding is in-order, and since the IDU 208 keeps track of the current transactional state and writes it into the issue queue 216 along with every instruction from the transaction, execution of TBEGIN, TEND, and instructions before, within, and after the transaction can be performed out-of order. It is even possible (though unlikely) that TEND is executed first, then the entire transaction, and lastly the TBEGIN executes. Program order is restored through the GCT 232 at completion time. The length of transactions is not limited by the size of the GCT 232, since general purpose registers (GRs) 228 can be restored from the backup register file 224.

During execution, the program event recording (PER) events are filtered based on the Event Suppression Control, and a PER TEND event is detected if enabled. Similarly, while in transactional mode, a pseudo-random generator may be causing the random aborts as enabled by the Transaction Diagnostics Control.

Tracking for Transactional Isolation

The Load/Store Unit 280 tracks cache lines that were accessed during transactional execution, and triggers an abort if an XI from another CPU (or an LRU-XI) conflicts with the footprint. If the conflicting XI is an exclusive or demote XI, the LSU 280 rejects the XI back to the L3 272 in the hope of finishing the transaction before the L3 272 repeats the XI. This "stiff-arming" is very efficient in highly contended transactions. In order to prevent hangs when two CPUs stiff-arm each other, a XI-reject counter is implemented, which triggers a transaction abort when a threshold is met.

The L1 cache directory 240 is traditionally implemented with static random access memories (SRAMs). For the transactional memory implementation, the valid bits 244 (64 rows×6 ways) of the directory have been moved into normal logic latches, and are supplemented with two more bits per cache line: the TX-read 248 and TX-dirty 252 bits.

The TX-read 248 bits are reset when a new outermost TBEGIN is decoded (which is interlocked against a prior still pending transaction). The TX-read 248 bit is set at execution time by every load instruction that is marked "transactional" in the issue queue. Note that this can lead to over-marking if speculative loads are executed, for example on a mispredicted branch path. The alternative of setting the TX-read 248 bit at load completion time was too expensive for silicon area, since multiple loads can complete at the same time, requiring many read-ports on the load-queue.

Stores execute the same way as in non-transactional mode, but a transaction mark is placed in the store queue (STQ) 260 entry of the store instruction. At write-back time, when the data from the STQ 260 is written into the L1 240, the TX-dirty bit 252 in the L1 cache directory 240 is set for the written cache line. Store write-back into the L1 240 occurs only after the store instruction has completed, and at most one store is written back per cycle. Before completion and write-back, loads can access the data from the STQ 260 by means of store-forwarding; after write-back, the CPU 114 (FIG. 1) can access the speculatively updated data in the L1 240. If the transaction ends successfully, the TX-dirty bits 252 of all cache-lines are cleared, and also the TX-marks of not yet written stores are cleared in the STQ 260, effectively turning the pending stores into normal stores.

On a transaction abort, all pending transactional stores are invalidated from the STQ 260, even those already completed. All cache lines that were modified by the transaction in the L1 240, that is, have the TX-dirty bit 252 on, have their valid bits turned off, effectively removing them from the L1 240 cache instantaneously.

The architecture requires that before completing a new instruction, the isolation of the transaction read- and write-set is maintained. This isolation is ensured by stalling instruction completion at appropriate times when XIs are pending; speculative out-of order execution is allowed, optimistically assuming that the pending XIs are to different addresses and not actually cause a transaction conflict. This design fits very naturally with the XI-vs-completion interlocks that are implemented on prior systems to ensure the strong memory ordering that the architecture requires.

When the L1 240 receives an XI, L1 240 accesses the directory to check validity of the XI'ed address in the L1 240, and if the TX-read bit 248 is active on the XI'ed line and the XI is not rejected, the LSU 280 triggers an abort. When a cache line with active TX-read bit 248 is LRU'ed from the L1 240, a special LRU-extension vector remembers for each of the 64 rows of the L1 240 that a TX-read line existed on that row. Since no precise address tracking exists for the LRU extensions, any non-rejected XI that hits a valid extension row the LSU 280 triggers an abort. Providing the LRU-extension effectively increases the read footprint capability from the L1-size to the L2-size and associativity, provided no conflicts with other CPUs 114 (FIGS. 1 and 2) against the non-precise LRU-extension tracking causes aborts.

The store footprint is limited by the store cache size (the store cache is discussed in more detail below) and thus implicitly by the L2 268 size and associativity. No LRU-extension action needs to be performed when a TX-dirty 252 cache line is LRU'ed from the L1 240.

Store Cache

In prior systems, since the L1 240 and L2 268 are store-through caches, every store instruction causes an L3 272 store access; with now 6 cores per L3 272 and further improved performance of each core, the store rate for the L3 272 (and to a lesser extent for the L2 268) becomes problematic for certain workloads. In order to avoid store queuing delays, a gathering store cache 264 had to be added, that combines stores to neighboring addresses before sending them to the L3 272.

For transactional memory performance, it is acceptable to invalidate every TX-dirty 252 cache line from the L1 240 on transaction aborts, because the L2 268 cache is very close (7 cycles L1 240 miss penalty) to bring back the clean lines. However, it would be unacceptable for performance (and silicon area for tracking) to have transactional stores write the L2 268 before the transaction ends and then invalidate all dirty L2 268 cache lines on abort (or even worse on the shared L3 272).

The two problems of store bandwidth and transactional memory store handling can both be addressed with the gathering store cache 264. The gathering store cache 264 is a circular queue of 64 entries, each entry holding 128 bytes of data with byte-precise valid bits. In non-transactional operation, when a store is received from the LSU 280, the store cache 264 checks whether an entry exists for the same address, and if so gathers the new store into the existing entry. If no entry exists, a new entry is written into the queue, and if the number of free entries falls under a threshold, the oldest entries are written back to the L2 268 and L3 272 caches.

When a new outermost transaction begins, all existing entries in the store cache are marked closed so that no new stores can be gathered into them, and eviction of those entries to L2 268 and L3 272 is started. From that point on, the transactional stores coming out of the LSU 280 STQ 260 allocate new entries, or gather into existing transactional entries. The write-back of those stores into L2 268 and L3 272 is blocked, until the transaction ends successfully; at that point subsequent (post-transaction) stores can continue to gather into existing entries, until the next transaction closes those entries again.

The store cache 264 is queried on every exclusive or demote XI, and causes an XI reject if the XI compares to any active entry. If the core is not completing further instructions while continuously rejecting XIs, the transaction is aborted at a certain threshold to avoid hangs.

The LSU 280 requests a transaction abort when the store cache 264 overflows. The LSU 280 detects this condition when it tries to send a new store that cannot merge into an existing entry, and the entire store cache 264 is filled with stores from the current transaction. The store cache 264 is managed as a subset of the L2 268: while transactionally dirty lines can be evicted from the L1 240, they have to stay resident in the L2 268 throughout the transaction. The maximum store footprint is thus limited to the store cache size of 64×128 bytes, and it is also limited by the associativity of the L2 268. Since the L2 268 is 8-way associative and has 512 rows, it is typically large enough to not cause transaction aborts.

If a transaction aborts, the store cache 264 is notified and all entries holding transactional data are invalidated. The store cache 264 also has a mark per doubleword (8 bytes) whether the entry was written by a NTSTG instruction—those doublewords stay valid across transaction aborts.

Millicode-Implemented Functions

Traditionally, IBM mainframe server processors contain a layer of firmware called millicode which performs complex functions like certain CISC instruction executions, interruption handling, system synchronization, and RAS. Millicode includes machine dependent instructions as well as instructions of the instruction set architecture (ISA) that are fetched and executed from memory similarly to instructions of application programs and the operating system (OS). Firmware resides in a restricted area of main memory that customer programs cannot access. When hardware detects a situation that needs to invoke millicode, the instruction fetching unit 204 switches into "millicode mode" and starts fetching at the appropriate location in the millicode memory area. Millicode may be fetched and executed in the same way as instructions of the instruction set architecture (ISA), and may include ISA instructions.

For transactional memory, millicode is involved in various complex situations. Every transaction abort invokes a dedicated millicode sub-routine to perform the necessary abort steps. The transaction-abort millicode starts by reading special-purpose registers (SPRs) holding the hardware internal abort reason, potential exception reasons, and the aborted instruction address, which millicode then uses to store a TDB if one is specified. The TBEGIN instruction text is loaded from an SPR to obtain the GR-save-mask, which is needed for millicode to know which GRs 238 to restore.

The CPU 114 (FIG. 1) supports a special millicode-only instruction to read out the backup-GRs 224 and copy them into the main GRs 228. The TBEGIN instruction address is also loaded from an SPR to set the new instruction address in the PSW to continue execution after the TBEGIN once the millicode abort sub-routine finishes. That PSW may later be saved as program-old PSW in case the abort is caused by a non-filtered program interruption.

The TABORT instruction may be millicode implemented; when the IDU 208 decodes TABORT, it instructs the instruction fetch unit to branch into TABORT's millicode, from which millicode branches into the common abort sub-routine.

The Extract Transaction Nesting Depth (ETND) instruction may also be millicoded, since it is not performance critical; millicode loads the current nesting depth out of a special hardware register and places it into a GR 228. The PPA instruction is millicoded; it performs the optimal delay based on the current abort count provided by software as an operand to PPA, and also based on other hardware internal state.

For constrained transactions, millicode may keep track of the number of aborts. The counter is reset to 0 on successful TEND completion, or if an interruption into the OS occurs (since it is not known if or when the OS will return to the program). Depending on the current abort count, millicode can invoke certain mechanisms to improve the chance of success for the subsequent transaction retry. The mechanisms involve, for example, successively increasing random delays between retries, and reducing the amount of speculative execution to avoid encountering aborts caused by speculative accesses to data that the transaction is not actually using. As a last resort, millicode can broadcast to other CPUs 114 (FIG. 1) to stop all conflicting work, retry the local transaction, before releasing the other CPUs 114 to continue normal processing. Multiple CPUs 114 must be coordinated to not cause deadlocks, so some serialization between millicode instances on different CPUs 114 is required.

A technique to make groups of store instructions atomic is the use of transactional memory (TM). The most difficult challenge to a hardware TM is handling writes. A TM system must track stores and assemble a write-set (WS) during the transaction. The actual WS data must be buffered until the transaction completes successfully. In the case of a success, all the stores in the WS become globally visible in an atomic fashion (i.e., all at once), typically by writing the buffered data to a cache. Alternatively, if the transaction aborts, then the buffered stores are discarded, without modifying memory.

Loads are somewhat simpler, because they do not alter memory. The TM must track transactional loads, creating a read-set (RS) that contains the data and the access address of each transactional load. A successful transaction transfers the data of the loads in the RS to the register file.

A primary function performed by transaction execution is to determine interference by remote requests, i.e., memory accesses not corresponding to the present application thread.

Often a TM monitors conflicts with the read-set and write-set at a cache line (e.g., a cache line that contains 64B) address granularity during a transaction. That is, the RS and the WS contain the addresses of the cache lines that transactional data reside in, not the addresses of the data within a cache line. An RS conflict occurs if any data in a cache line in the read-set is written to by another thread. A WS conflict occurs if any data in a cache line in the WS is read or written by another thread. When a conflict occurs, the transaction aborts and squashes the effects of (i.e., undo the effects of) any loads and stores participating in the transaction that have affected a state of the computer. However, to accomplish this, an implementation of a TM does not allow any loads and stores that participate in a transaction to alter the architected state of a computer until the transaction successfully completes.

To improve performance, a computer architecture often includes prefetch instructions that can move data from main memory or a lower cache level to a higher cache level (closer to the processor) in anticipation of an access to the data. The execution of a prefetch instruction can be speculative in nature in that it may be performed before it is known that the data moved by the prefetch instruction will actually be accessed. Data in anticipation of either a read access or a write access may be prefetched, which is called a read prefetch or a write prefetch respectively. Cache coherency protocols in computers, that enable the sharing, synchronization, and parallel processing of data, often require a processor to gain ownership of the data before it can be written to (i.e., changed). Because the data may be currently owned by another processor, gaining ownership can be a lengthy process. The concept of ownership is necessary to prevent data that is being read by one processor from a memory location from being changed by another processor that writes to the same location or a different location (if copies of the data are in different locations). Therefore, it is often advantageous for a processor to execute a write prefetch instruction to gain ownership of the data in anticipation of writing to the data so that processing is not delayed while ownership is acquired.

In accordance with the present invention, embodiments avoid performance degradation traditionally associated with the execution of prefetch instructions in existing transactional memory systems, where prefetch instructions (i.e., prefetch requests) cause transactions to fail. In an embodiment of the present invention, the execution of prefetch instructions does not require a memory transaction in a transactional memory system in a local processor to abort due to an address conflict with a prefetch request from a remote processor. In an embodiment of the present invention, a prefetch instruction (i.e., a prefetch request) can cause a memory transaction (i.e., a transaction) to abort due to an address conflict under certain conditions (e.g., if a priority or importance of the prefetch is higher than that of the memory transaction). In an embodiment, a prefetch request that conflicts with a transaction is evaluated, where evaluated includes one or more of i) comparing a priority of the prefetch request with a priority of the transaction, ii) comparing a priority of the local processor with a priority of the remote processor, and iii) determining an importance of the prefetch request. In an embodiment, an action is performed that is based on the evaluation where the action includes one or more of i) aborting the prefetch request, ii) quiescing the prefetch request (i.e., placing the prefetch request in a dormant but watchful state while waiting for a condition to occur before an action is taken), iii) delaying the prefetch request for a delay period (i.e., placing the prefetch request in a dormant state until the delay period is over before taking an action), and iv) executing the prefetch request. In an embodiment, a duration of a given delay is determined by one or both of i) one or more conditions in the local processor, and ii) one or more conditions in the remote processor. For example, in an embodiment, a delay period, i.e., a duration of a given delay, depends on conditions in the local processor (e.g., cpu utilization, cache utilization, and number of queued workloads, and current instructions executed per cycle). In another example, in one embodiment, a delay period depends on conditions in a remote processor that generated the prefetch request (e.g., cpu utilization, cache utilization, and number of queued workloads, and current instructions executed per cycle).

In an embodiment, a prefetch request is suppressed if the prefetch request conflicts with a transaction, where the meaning of the term suppressed includes any temporal sequence of and combination of: i) not immediately processing the prefetch request (i.e., delaying the prefetch request), ii) queuing the prefetch request, and iii) aborting the prefetch request. Each of these operations constitute a suppression of a prefetch request in the present invention.

In an embodiment, a prefetch request operation (i.e., a prefetch operation) is a memory access that is performed during the execution of a prefetch request. It is likely that a performance increase due to executing a prefetch request is considerably less than a performance decrease that results from a memory transaction abort. In an embodiment, a prefetch request participates in a prefetch protocol (which is part of the memory and cache coherence protocols described herein) that identifies a read or a write memory access as a prefetch request and provides information about the prefetch request such that the prefetch request can be managed without causing a transaction abort if the memory operation associated with the prefetch request conflicts with the transaction. In an embodiment, a prefetch protocol includes a read prefetch request operation and a write prefetch request operation. In an embodiment, a prefetch request includes one or more prefetch operations. In an embodiment, the prefetch protocol includes one or more prefetch acknowledgements sent from a receiver of a prefetch request to the source of the prefetch request (i.e., notifying the source of a prefetch request of the status of the prefetch request). In an embodiment, a prefetch acknowledgement includes information about the disposition (i.e., the status) of the prefetch at the receiver of the prefetch request (e.g., a local processor).

In an embodiment, the prefetch request is discarded in the receiving node if it is determined that processing the prefetch request would cause a memory transaction abort. In an embodiment, if the source of the prefetch request (e.g., a remote processor) designates a prefetch request as being particularly important, the prefetch request is queued in the receiving node and performed when it will no longer cause a memory transaction abort. In an embodiment, there is a separate queue for each remote processor and a prefetch request from a remote processor is queued in the queue for that remote processor. In an embodiment, there is a queue for prefetch requests for data for exclusive ownership and a queue for prefetch requests for data for shared ownership. In an embodiment, if the prefetch request contains a plurality of prefetch request operations (i.e., prefetch operations), then each prefetch operation is queued separately. In an embodiment, a priority is associated with a prefetch request (e.g., the priority of the source of the prefetch). In an embodiment, a prefetch operation in a queue in the receiver of the prefetch request is serviced according to the priority of the prefetch request. In an embodiment, a priority is associated with the source of a prefetch request and the receiver of a prefetch request. In an embodiment, if the source of a prefetch request (e.g., a remote processor) has a higher priority than the priority of the receiver of the prefetch (e.g., a local processor), the prefetch request is serviced and is allowed to cause a transaction to abort in the receiver if it conflicts with the transaction. In an embodiment, there is a separate queue for each prefetch request priority and a prefect with a priority is queued in the queue for that priority.

In an embodiment, a prefetch protocol includes a prefetch time horizon that is associated with each prefetch request that is measured in cycles that the receiver of a prefetch request uses to decide how to manage a prefetch request. In an embodiment, a prefetch request is discarded after a prefetch time horizon associated with the prefetch request transpires if it is queued and has not yet been serviced. In an embodiment, if a prefetch request is discarded by the receiver of the prefetch request, then a notification is sent to the source of the prefetch request that the prefetch request was discarded. In some embodiments, the time horizon is specified in other metrics, e.g., number of instructions executed, number of memory instructions executed, or any other metric associated to a program and/or processor.

In an embodiment, a prefetch protocol includes a specification of a prefetch time horizon that is associated with a prefetch operation that is divided into time steps, from the near future to the far future, with each time step specified in a preset number of cycles that the receiver of a prefetch request uses to manage a prefetch request. In an embodiment, an execution of a prefetch request is delayed for a number of time steps that is passed to a receiver of the prefetch request by the prefetch protocol in a delay information. In an embodiment, the receiver of the prefetch request delays the prefetch request for the specified number of time steps (i.e., a delay period, or equivalently, a delay duration), after which, an attempt is made to execute the prefetch request. In an embodiment, if the prefetch request encounters a conflict with a memory transaction in the attempt to execute the prefetch request after the delay transpires, the prefetch request is aborted. In an embodiment, if the prefetch request encounters a conflict with a memory transaction in the attempt to execute the prefetch request after the delay transpires, the prefetch request is queued in a queue.

In an embodiment, if a prefetch request has a conflict with a memory transaction and the number of time steps specified in the prefetch protocol is less than a threshold, then the prefetch request is discarded; otherwise the prefetch request is queued in a queue. In an embodiment, a prefetch request in a prefetch protocol is designated as a short-range prefetch request or a long-range prefetch request. In an embodiment, a short-range prefetch request is alive (i.e., the prefetch request has a potential to be executed) for a specified number of cycles. While a short-range prefetch request is alive, a short-range prefetch request is queued if the short-range prefetch request has a conflict with a memory transaction, and when the short-range prefetch request is no longer alive, it is aborted. In an embodiment, a long-range prefetch request remains alive until it is executed. In an embodiment, a long-range prefetch request is queued in a queue if it has a conflict with a memory transaction, and is removed from the queue and executed when that long-range prefetch request no longer has a conflict with a memory transaction. In an embodiment, a long-range prefetch request is removed from the queue and discarded if the queue becomes full and that long-range prefetch request is the oldest prefetch request in the queue. In an embodiment, if there is at least one entry in the queue that is not a long-range prefetch request and a given long-range prefetch request in the queue is the oldest prefetch request in the queue, then the oldest long-range prefetch request is not removed from the queue and discarded if the queue becomes full. In one such embodiment and scenario, if the queue becomes full and at least one entry is not a long-range prefetch request, then at least one entry in the queue that is not a long-range prefetch request is removed from the queue. In an embodiment, a long-range prefetch request is not removed from the queue and discarded if the queue becomes full.

Figure 4:
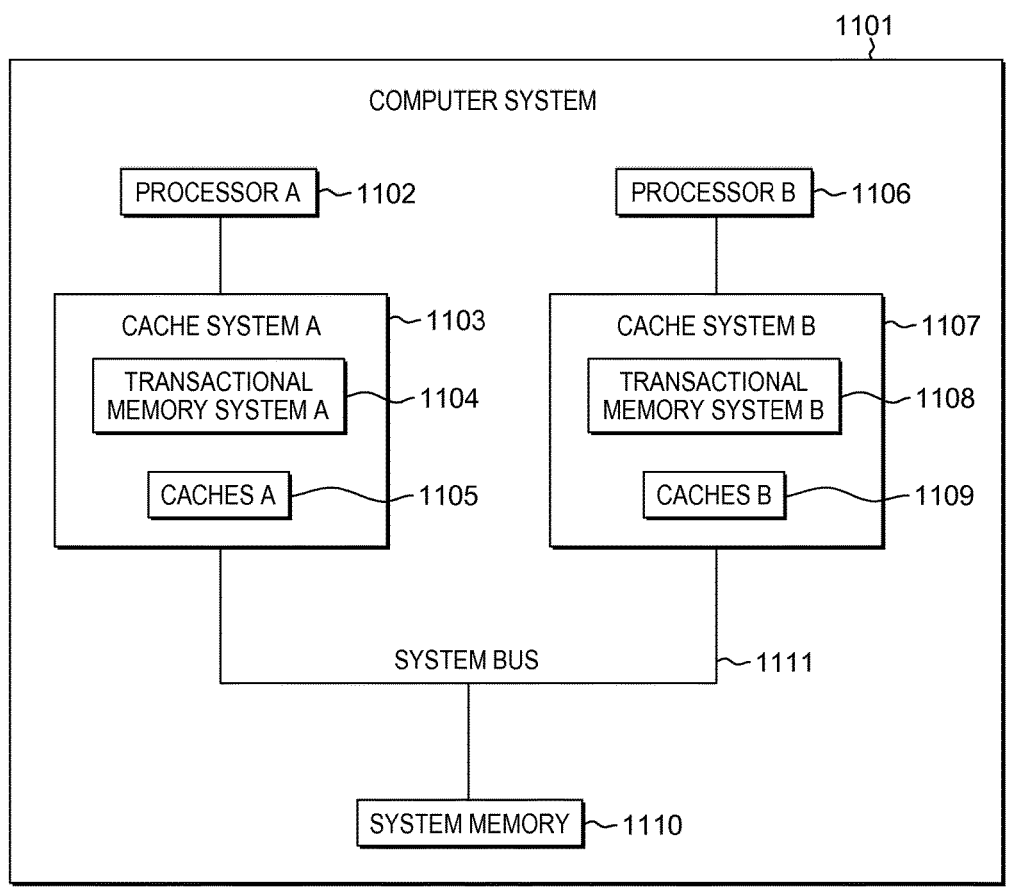
FIG. 4 depicts a block diagram of a portion of a computing system, in accordance with an embodiment of the present invention.

FIG. 4 depicts processor system 1101 that, in an embodiment, includes processor A 1102 connected to cache system A 1103 and processor B 1106 connected to cache system B 1107. Cache system A 1103 and cache system B 1107 are connected to system bus 1111 and are essentially similar. Cache system A 1103 includes transactional memory system A 1104 and caches A 1105. Cache system B 1107 includes transactional memory system B 1108 and caches B 1109. System memory 1110 is attached to system bus 1110. In an embodiment, cache system A 1103 and cache system B 1107 participate in a cache coherency protocol that enables processor A 1102 and processor B to execute instructions that operate on data that is shared by both processors in an organized manner. For example, processor B 1106 can execute a read instruction that accesses data from cache system B 1107 and if cache system B 1107 does not have the data, cache system B 1107 will assert a cache coherency protocol request for the data on system bus 1111. Cache system A 1103 monitors (snoops) cache coherency protocol requests on system bus 1111, and if cache system A 1103 has the requested data, it will assert the data on system bus 1111. Cache system A 1103 also compares the address of the requested data to determine if the address conflicts with an active transactional memory operation. In an embodiment, transactional memory system A 1104 in cache system A 1103 determines if a memory access address conflicts with that of an active transactional memory operation.

Figure 5:
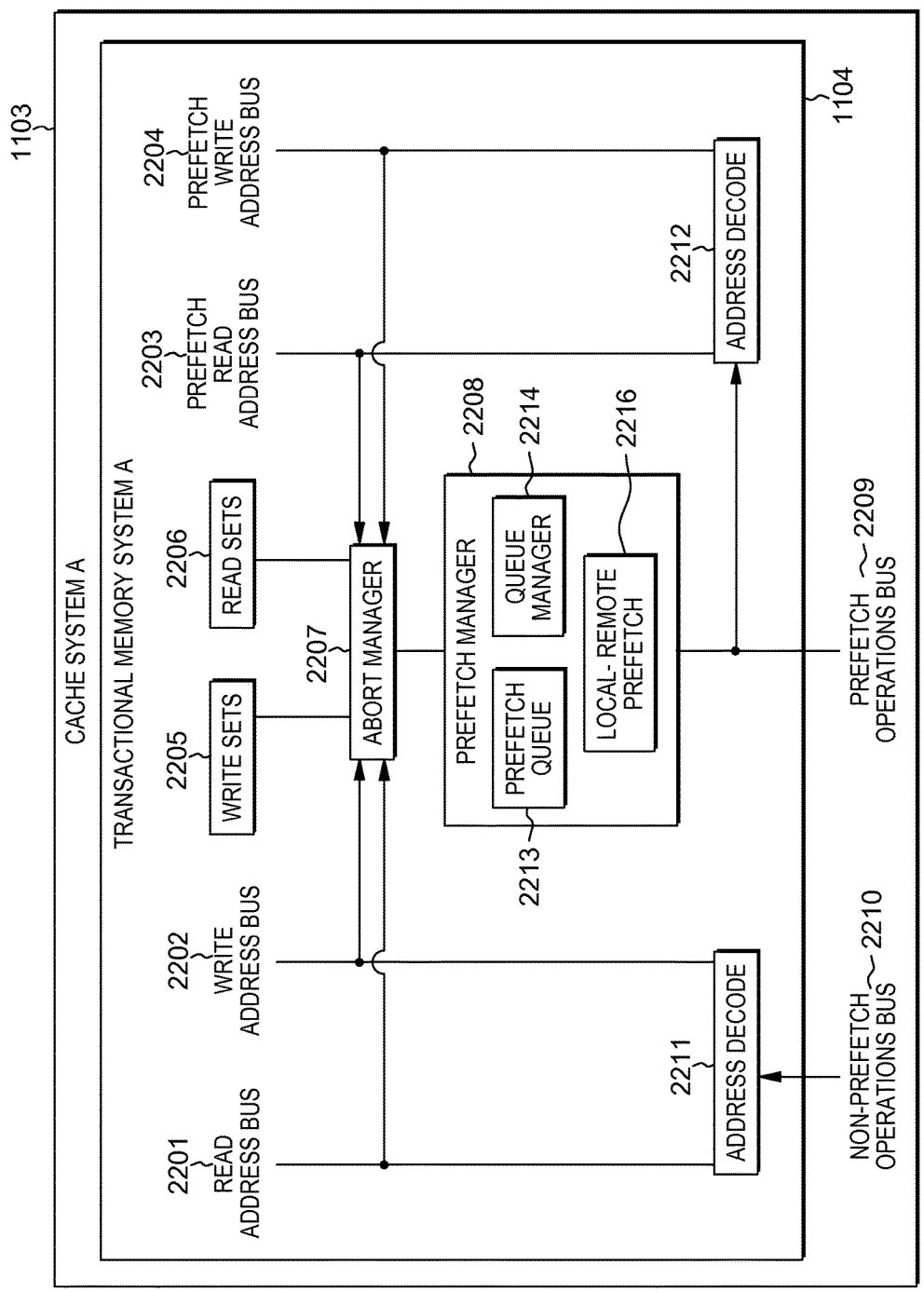
FIG. 5 depicts a cache system depicted in FIG. 4, in accordance with an embodiment of the present invention.

FIG. 5 shows transactional memory system A 1104 in more detail. In an embodiment, transactional memory system A 1104 includes write sets 2205, read sets 2206, abort manager 227, and prefetch manager 2208. Write sets 2205 contains the target addresses of writes (stores) that are participating in a transaction. Read sets 2206 contains the target addresses of reads (loads) that are participating in a transaction. In an embodiment, read sets 2206 and write sets 2205 contain the read and write addresses respectively of one or more memory rad and write accesses within a transaction.

In an embodiment, inputs to transactional memory system A 1104 include non-prefetch operations (i.e., non-prefetch memory accesses) on non-prefetch operations bus 2210 and prefetch operations (i.e., prefetch request memory accesses) on prefetch operations bus 2209. Address decode 2211 decodes the address of a non-prefetch operation and asserts the target address of a non-prefetch read operation on read address bus 2201 and the target address of a non-prefetch write operation on write address bus 2202. Address decode 2212 decodes the address of a prefetch operation and asserts the target address of a prefetch read operation is on prefetch read address bus 2203 and the target address of a prefetch write operation on prefetch write address bus 2204. Prefetch manager 2208 is connected to abort manager 2207 and receives all prefetch operations that are input to transactional memory system A 1104 from prefetch operations bus 2209.

Read address bus 2201 and write address bus 2202 are inputs to abort manager 2207. In an embodiment, if abort manager 2207 detects that an address on read address bus 2201 matches an address in write set 2205, abort manager 2207 aborts the transactional memory operation that contains writes to the address. In an embodiment, if abort manager 2207 detects that an address on write address bus 2202 matches an address in write set 2205 or matches an address in read set 2206, abort manager 2207 aborts the transaction.

Prefetch read address bus 2203 and prefetch write address bus 2204 are inputs to abort manager 2207. In an embodiment, if abort manager 2207 detects that an address on prefetch read address bus 2203 matches an address in write set 2205, abort manager 2207 notifies prefetch manager 2208 that a conflict with a current prefetch operation address has occurred. In an embodiment, abort manager 2207 does not abort the transaction that contains a write to the address. In an embodiment, abort manager 2207 aborts the transaction that contains a write to the address if directed to abort by prefetch manager 2208. In an embodiment, if abort manager 2207 detects that an address on prefetch write address bus 2204 matches an address in write set 2205 or matches an address in read set 2206, abort manager 2207 notifies prefetch manager 2208 that a conflict with a current prefetch operation address has occurred. In an embodiment, abort manager 2207 does not abort the transaction. In an embodiment, abort manager 2207 aborts the transaction if directed to do so by prefetch manager 2208.

In an embodiment, prefetch manager 2208 includes prefetch queue 2213, queue manager 2214, and local-remote prefetch 2216. In an embodiment, local-remote prefetch 2216 classifies a prefetch operation as either a local prefetch operation (e.g., from a local processor) or a remote prefetch operation (e.g., from a remote processor). A prefetch operation is either a local prefetch operation or a remote prefetch operation relative to a memory transaction. A prefetch operation is local to a memory transaction if the prefetch operation is generated on the same processor (e.g., the local processor) that generated the memory transaction and accesses a cache that is accessed by the memory transaction; otherwise the prefetch operation is a remote prefetch operation (e.g., from a remote processor) relative to the memory transaction. Therefore, a prefetch operation is local to all transactional memory operations created by the thread of execution that created the prefetch operation. In an embodiment, a prefetch operation that local-remote prefetch 2216 classifies as local relative to a transaction cannot conflict with reads or writes in write sets 2205 or read sets 2206 that are associated with the transaction. In particular, a prefetch is local when it is attached to the present transactional memory system (e.g., when multiple threads within a single processor, e.g., processor 1102, or multiple processors are attached to the present transactional memory system).

In an embodiment, if prefetch manager 2208 is notified that a current prefetch operation conflicts with a transaction, prefetch manager 2208 discards the prefetch operation and the prefetch request associated with the prefetch operation. In an embodiment, if prefetch manager 2208 discards a prefetch operation, prefetch manager 2208 sends a response to the source of the prefetch notifying the source that the prefetch was discarded. In an embodiment, if prefetch manager 2208 is notified by abort manager 2207 that a current prefetch operation conflicts with an existing transaction, queue manager 2214 queues the prefetch operation in prefetch queue 2213. In an embodiment, prefetch manager 2208 processes the queued prefetch operation after the conflicting transactional memory operation is either complete or is aborted. In an embodiment, if queue manager 2214 queues a prefetch operation in prefetch queue 2213, prefetch manager 2208 sends a response to the source of the prefetch request notifying the source that the prefetch operation was queued.

In an embodiment, prefetch operations on prefetch operations bus 2209 participate in a prefetch protocol that includes a prefetch request. A prefetch request describes a memory access for data that is a prefetch memory access and not a regular read or write memory access for which the need for the data is certain. In an embodiment, a prefetch request is identified with a unique tag. In an embodiment, the unique tag may not be reused in a system until such time that it becomes impossible for a duplicate of the unique tag to exist in the system. In an embodiment, the prefetch request includes a prefetch information (included in the prefetch request at the source of the prefetch request) that enables the prefetch operation (that is the result of the prefetch request) to be efficiently managed by prefetch manager 2208 when the prefetch operation is processed. In an embodiment, the prefetch information includes a priority information about the source of the prefetch operation. In an embodiment, if prefetch manager finds that the priority of the source of the prefetch operation exceeds the priority of the process that created a transactional memory operation (that has an address conflict with the prefetch operation), prefetch manager 2208 allows the prefetch operation to proceed and the transaction is aborted by abort manager 2207. In an embodiment, prefetch manager finds that the ratio of the priority of the source of the prefetch operation to the priority of the process that created a transaction (that has an address conflict with the prefetch operation) exceeds a threshold, the prefetch operation proceeds and the transaction is aborted. In an embodiment, if a prefetch operation causes a memory transaction to abort, prefetch manager 2208 sends a notification to the source of the prefetch operation indicating that the prefetch operation proceeded with a consequential abort of a transaction. In addition, a transaction abort is communicated to the processor corresponding to the transaction to roll back the transaction state, and restart executing the transaction, or an alternate path.

In an embodiment, the prefetch information in a prefetch request includes a prefetch horizon. In an embodiment, the prefetch horizon is specified as a number of cycles for which queue manager 2214 can queue the prefetch operation in prefetch queue 2213 if it is in address conflict with a transactional memory operation. In an embodiment, the prefetch horizon is specified as a number of instruction executions at the source of the prefetch, which is converted into a number of cycles at the receiver of the prefetch. In an embodiment, a conversion from the number of instruction executions at the source to a number of cycles at the receiver is performed using a static conversion factor, which does not change during execution. In an embodiment, a conversion from the number of instruction executions at the source to a number of cycles at the receiver is performed during execution using a dynamically computed conversion factor (e.g., by multiplying the number of instructions by a current cycles-per-instruction conversion factor) computed by the receiver of the prefetch.

In an embodiment, a local processor receiving prefetch requests tracks the number of cycles expected to be remaining in the one or more current transactions with which the prefetch conflicts. In an embodiment, a count of the expected number of remaining cycles in one or more transactions is maintained. In an embodiment, if the end time of a time horizon for a prefetch is less than the end time after an expected number of cycles that remains in a conflicting transaction, the prefetch request is discarded and otherwise the prefetch request is queued.

In an embodiment, if the prefetch operation has not been processed within the prefetch horizon number of cycles, queue manager 2214 removes the prefetch operation from prefetch queue 2213 and discards it. In an embodiment, if the prefetch operation is discarded after the prefetch horizon number of cycles, prefetch manager 2208 notifies the source of the prefetch that the prefetch has been discarded because the prefetch horizon was exceeded.

In an embodiment, the prefetch information in a prefetch request includes the importance of the source of the prefetch request. In an embodiment, if the importance of the source exceeds a threshold and if the prefetch request is in address conflict with a transactional memory operation, prefetch manager 2208 queues the prefetch operation and otherwise the prefetch request is discarded.

In an embodiment, when prefetch queue 2213 is full, an arriving prefetch request is discarded. In an embodiment, when an incoming prefetch request is discarded because prefetch queue 2213 is full, a response to the prefetch request is sent to the source of the prefetch request that informs it that the prefetch request was discarded because prefetch queue 2213 was full. In an embodiment, if prefetch queue 2213 is full, an entry from prefetch queue 2213 is selected and discarded. In an embodiment, queue manager 2214 selects a prefetch in prefetch queue 2213 that is to be discarded. In an embodiment, if queue manager 2214 discards a prefetch from prefetch queue 2213 to make room for another prefetch request, the source of the discarded prefetch is notified that the prefetch request was discarded to make room for another prefetch request. In an embodiment, if a prefetch request causes an expulsion from prefetch queue 2213, the source of the prefetch request is notified that the prefetch request caused an expulsion from prefetch queue 2213. In an embodiment, if an expulsion from the prefetch queue is performed, the oldest entry in the prefetch queue is discarded. In another embodiment, the prefetch request that is discarded from prefetch queue 2213 is the prefetch request at the head of prefetch queue 2213. In another embodiment, the prefetch request in prefetch queue 2213 that is discarded is the prefetch request with a shortest time horizon, that is the prefetch request with the soonest end time. In another embodiment, the prefetch request selected from the queue to be discarded is the prefetch request with the greatest time horizon, that is, the prefetch request with an end time that is farthest into the future.

In other embodiments, various buses in FIG. 5 are combined. Thus, in one or more of such embodiments, as non-limiting examples, the function of read address bus 2201 and prefetch read address bus 2203 are performed by a single read bus with a request type indicator; the function of write address buss 2202 and prefetch write bus 2204 are performed by a single write bus with a request type indicator; the function of prefetch buses 2203 and 2204 are performed by a single prefetch bus with a request type indicator; the functions of non-prefetch buses 2201 and 2203 are performed by a single non-prefetch bus with a bus indicator; the functions of all buses are performed by a single address bus with a request type indicator. In other embodiments, request and address buses are combined.

In some scenarios and embodiments, a prefetch protocol includes a read request that is asserted on a bus based or switch based interconnect that includes an information as to a purpose of a prefetch request. In an embodiment, in a system that incorporates a MESI cache coherency protocol, the cache coherency protocol is enhanced to include a read request that includes a specification as to whether the read request is a demand request (i.e., a non-prefetch request for data) or a prefetch request. In an embodiment, a prefetch request is a prefetch for exclusive ownership of a data (e.g., to read or write a data) or a prefetch for shared ownership of a data (e.g., to read the data).

Figure 6:
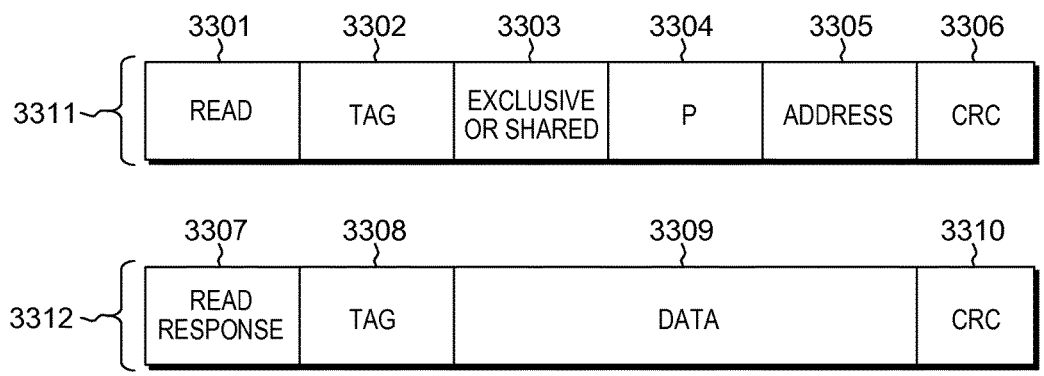
FIG. 6 depicts a format of a read request and a response to a read request, in accordance with an embodiment of the present invention.

FIG. 6 depicts an embodiment of a format of a read request that specifies a demand request or a prefetch request and further specifies whether a prefetch request is for exclusive ownership of a data or a prefetch for shared ownership of a data. In an embodiment, read request 3311 is comprised of at least six information fields: read information field 3301, tag information field 3302, exclusive or shared information field 3303, p (prefetch) information field 3304, address information field 3305, and CRC (cyclic redundancy check) information field 3306. In an embodiment, read information field 3301 identifies read request 3311 as a read request; tag information field 3302 identifies a particular instance of read request 3311; exclusive or shared information field 3303 specifies whether read request 3311 is for an exclusive or shared access to a data; p information field 3304 specifies whether or not read request 3311 is a prefetch request; address information field 3305 specifies the address of the data requested by read request 3311; CRC information field 3306 contains a value that is computed from the bit-patterns of the values in the other information fields in read request 3311 and is used to detect an error that occurred during a transfer of read request 3311 from a source of read request 3311 to a destination of read request 3311.

FIG. 6 also depicts an embodiment of a format of a response to read request 3311, read response 3312. In an embodiment, read response 3312 is comprised of at least four information fields: read response information field 3307, tag information field 3308, data information field 3309, and CRC information field 3310. In an embodiment, read response information field 3307 identifies read response 3312 as a read response; tag information field 3308 identifies read response 3312 as a response to a read request 3311 with tag information field 3302 equal to tag information field 3308; data information field 3309 contains a data that is the data requested by a read request 3311 with a tag information field 3302 that is equal to tag information field 3308. CRC information field 3310 contains a value that is computed from the bit-patterns of the values in the other information fields in read response 3312 and is used to detect an error that occurred during a transfer of read response 3312 from a source of read response 3312 to a destination of read response 3312.

In some scenarios and embodiments, a prefetch protocol includes a prefetch request that is asserted on a bus based or switch based interconnect that includes an information as to a purpose of a prefetch request. In an embodiment, in a system that incorporates a MESI cache coherency protocol, the cache coherency protocol is enhanced to include a prefetch request that includes a specification as to whether the prefetch request is a prefetch for exclusive ownership of a data or a prefetch for shared ownership of a data.

Figure 7:
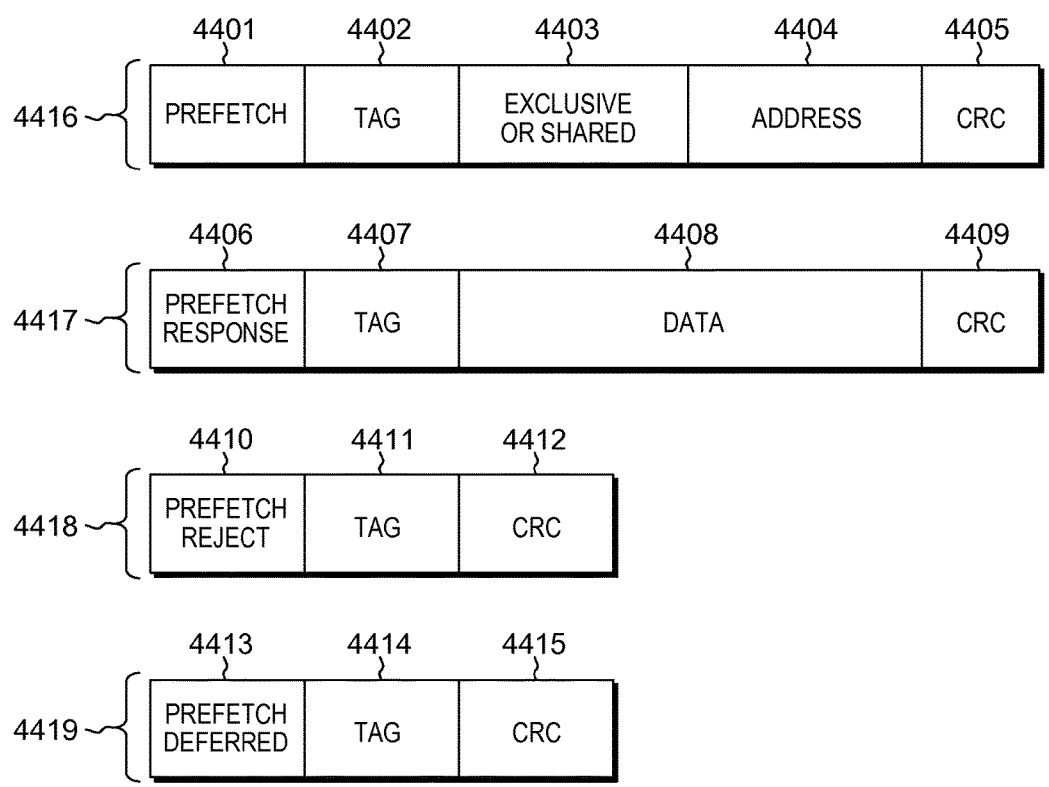
FIG. 7 depicts a format of a prefetch request, in accordance with an embodiment of the present invention.

FIG. 7 depicts an embodiment of a format of a prefetch request 4416 and an embodiment of a format for each of three types of response to prefetch request 4416: prefetch response 4417 (indicating that prefetch request 4416 was executed), prefetch reject response 4418 (indicating that prefetch request 4416 was rejected), and prefetch deferred response 4419 (indicating that prefetch request 4416 was deferred). In an embodiment, prefetch request 4416 specifies whether a prefetch request 4416 is for either exclusive ownership of a data or a prefetch for shared ownership of a data. In an embodiment, prefetch request 4416 is comprised of at least five information fields: prefetch information field 4401, tag information field 4402, exclusive or shared information field 4403, address information field 4404, and CRC (cyclic redundancy check) information field 4405. In an embodiment, prefetch information field 4401 identifies read request 4416 as a prefetch request; tag information field 4402 identifies a particular instance of prefetch request 4416; exclusive or shared information field 4403 specifies that prefetch request 4416 is either a prefetch request for exclusive access or a prefetch for shared access; address information field 4404 specifies the address of the data requested by prefetch request 4416; CRC information field 4405 contains a value that is computed from the bit-patterns of the values in the other information fields in prefetch request 4416 and is used to detect an error that occurred during a transfer of prefetch request 4416 from a source of prefetch request 4416 to a destination of prefetch request 4416.

FIG. 7 also depicts an embodiment of a format for prefetch response 4417. In an embodiment, prefetch response 4417 is sent in response to a prefetch request 4416, from a destination that received the prefetch request 4416, when the action in prefetch request 4416 is executed. In an embodiment, prefetch response 4417 is comprised of at least four information fields: prefetch response information field 4406, tag information field 4407, data information field 4408, and CRC information field 4409. In an embodiment, prefetch response information field 4406 identifies prefetch response 4417 as a prefetch response; tag information field 4407 identifies prefetch response 4417 as a response to a prefetch request 4416 with tag information field 4407 equal to tag information field 4402; data information field 4408 contains a data that is the data requested by a prefetch request 4416 with a tag information field 4402 that matches tag information field 4407; CRC information field 4409 contains a value that is computed from the bit-patterns of the values in the other information fields in prefetch response 4417 and is used to detect an error that occurred during a transfer of prefetch response 4417 from a source of prefetch response 4417 to a destination of prefetch response 4417.

FIG. 7 also depicts an embodiment of a format of a second type of response to prefetch request 4416, prefetch reject response 4418. In an embodiment, prefetch reject response 4418 is sent in response to a prefetch request 4416, from a destination that received the prefetch request 4416, when the action requested by prefetch request 4416 is rejected (i.e., aborted). In an embodiment, prefetch reject response 4418 is comprised of at least three information fields: prefetch reject information field 4410, tag information field 4411, and CRC information field 4412. In an embodiment, prefetch reject information field 4410 identifies prefetch reject response 4418 as a prefetch reject response; tag information field 4411 identifies prefetch reject response 4418 as a response to a prefetch request 4416 with a tag information field 4402 equal to tag information field 4411; CRC information field 4409 contains a value that is computed from the bit-patterns of the values in the other information fields in prefetch reject response 4418 and is used to detect an error that occurred during a transfer of prefetch reject response 4418 from a source of prefetch reject response 4418 to a destination of prefetch reject response 4418.

FIG. 7 also depicts an embodiment of a format of a third type of response to prefetch request 4416, prefetch deferred response 4419. In an embodiment, prefetch deferred response 4419 is sent in response to a prefetch request 4416, from a destination that received the prefetch request 4416, when the action requested by prefetch request 4416 is deferred or delayed (e.g., queued in the destination). In an embodiment, prefetch deferred response 4419 is comprised of at least three information fields: prefetch deferred information field 4413, tag information field 4414, and CRC information field 4415. In an embodiment, prefetch deferred information field 4413 identifies prefetch deferred response 4419 as a prefetch reject response; tag information field 4414 identifies prefetch deferred response 4419 as a response to a prefetch request 4416 with an tag information field 4402 equal to tag information field 4414; CRC information field 4415 contains a value that is computed from the bit-patterns of the values in the other information fields in prefetch deferred response 4419 and is used to detect an error that occurred during a transfer of prefetch deferred response 4419 from a source of prefetch deferred response 4419 to a destination of prefetch deferred response 4419.

In an embodiment, a prefetch protocol includes a packed prefetch request that is comprised of a plurality of prefetch operations, with each prefetch operation having an associated address that is specified in the packed prefetch request. In an embodiment, all the prefetch operations in the packed prefetch request are of a same type of packed prefetch request. In an embodiment, a packed prefetch request can include either a plurality of prefetch requests for exclusive ownership of a data or a plurality of prefetch requests for shared ownership of a data, but not both. In an embodiment, each prefetch operation in the packed prefetch request can be a type of prefetch operation (e.g., a prefetch for exclusive ownership or a prefetch for shared ownership) that is independent of a type of another prefetch operation included in the packed prefetch request.

In an embodiment, the one or more addresses in a packed prefetch request are in a sequence of addresses and each address has a unique index associated with the address. In an embodiment, the value of an index of an address (i.e., the address index) takes the value of the position of the address in the sequence of addresses in the packed prefetch request. In an embodiment, a packed prefetch request includes a packed prefetch request tag that identifies the packed prefetch request. In an embodiment, the packed prefetch request tag is comprised of a unique tag for the packed prefetch request and a unique tag for each address in the sequence of addresses.

In an embodiment, a response to a packed prefetch request (e.g., a response with data, a response indicating a rejection of a prefetch operation, or a response indicating that an operation has been deferred) in the prefetch protocol is associated with an prefetch operation included in the packed prefetch request. The response includes the tag of the packed prefetch request and an identifier of the address (i.e., an address identifier) of the prefetch operation in the packed prefetch request to which the response is associated. Since a packed prefetch request can incorporate one or more prefetch operations, a response to an operation in the packed prefetch request must identify the individual prefetch operation to which the response is associated. In an embodiment, the address identifier is the index of an address in the sequence of one or more addresses in the packed prefetch request. In an embodiment, the address identifier is a unique tag for the address that is included in the packed prefetch tag of the packed prefetch request.

Figure 8:
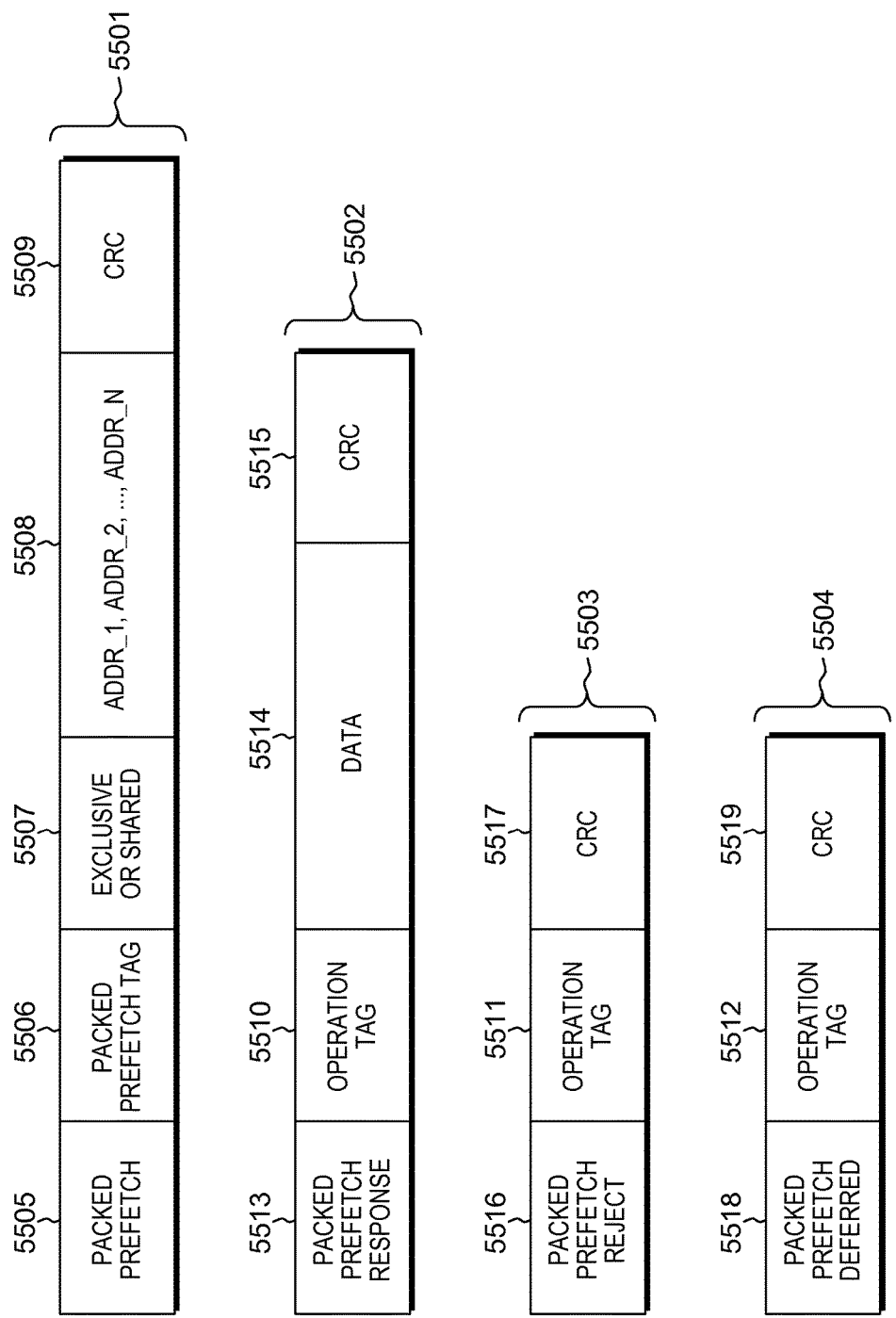
FIG. 8 depicts a format of a packed prefetch request, in accordance with an embodiment of the present invention.

FIG. 8 depicts an embodiment of a format of a packed prefetch request 5501 and an embodiment of a format for each of three types of response to packed prefetch request 5501: packed prefetch response 5502 (indicating that a prefetch operation in packed prefetch request 5501 was executed), packed prefetch reject 5503 (indicating that a prefetch operation in packed prefetch request 5501 was rejected), and packed prefetch deferred 5504 (indicating that a prefetch operation in packed prefetch request 5501 was deferred). In an embodiment, packed prefetch request 5501 is comprised of at least five information fields: packed prefetch information field 5505, packed prefetch tag information field 5506, exclusive or shared information field 5507, address information field 5508, and CRC (cyclic redundancy check) information field 5501. In an embodiment, packed prefetch information field 5505 identifies packed prefetch request 5501 as a packed prefetch request; packed tag information field 5506 identifies a particular instance of packed prefetch request 5501; exclusive or shared information field 5507 specifies that prefetch request 5501 is either a prefetch request for exclusive access or a prefetch for shared access; address information field 5508 specifies one or more addresses of the data requested by packed prefetch request 5501; CRC information field 5509 contains a value that is computed from the bit-patterns of the values in the other information fields in packed prefetch request 5509 and is used to detect an error that occurred during a transfer of packed prefetch request 5509 from a source of prefetch request 5509 to a destination of packed prefetch request 5509. In an embodiment, packed tag information field 5506 includes a unique tag for packed prefetch 5501 and a unique tag for each address in address information field 5508.

FIG. 8 also depicts an embodiment of a format of packed prefetch response 5502, which is a response to a prefetch operation in packed prefetch 5501. In an embodiment, packed prefetch response 5502 is sent from a destination that received a packed prefetch request 5501 in response to the packed prefetch request 5501, when a prefetch operation in packed prefetch request 5501 is executed. In an embodiment, packed prefetch response 5502 is comprised of at least four information fields: packed prefetch response information field 5513, operation tag information field 5510, data information field 5514, and CRC information field 5515. In an embodiment, packed prefetch response information field 5513 identifies packed prefetch response 5502 as a packed prefetch response; operation tag information field 5510 identifies packed prefetch response 5502 as a response to a prefetch operation in packed prefetch request 5501 with packed prefetch tag 5506; data information field 5514 contains a data that is the data requested by a prefetch operation in prefetch request 5501 with a operation tag information field 5510 that includes the unique tag that identifies a unique instance of packed prefetch 5501 and an address identifier that identifies a unique prefetch operation within the unique instance of packed prefetch 5501; CRC information field 5515 contains a value that is computed from the bit-patterns of the values in the other information fields in packed prefetch response 5502 and is used to detect an error that occurred during a transfer of packed prefetch response 5502 from a source of packed prefetch response 5502 to a destination of packed prefetch response 5502. In an embodiment, the address identifier in operation tag 5510 is a unique address tag that is included in packed prefetch tag information field 5506. In an embodiment, the address identifier in operation tag 5510 is an index of an address that is included in address information field 5508.

FIG. 8 also depicts an embodiment of a format of a second type of response to packed prefetch request 5501, packed prefetch reject response 5503. In an embodiment, packed prefetch reject response 5503 is sent in response to a prefetch operation in a packed prefetch request 5501, from a destination that received the packed prefetch request 5501, when a prefetch operation included in packed prefetch request 5501 is rejected (i.e., aborted). In an embodiment, packed prefetch reject response 5503 is comprised of at least three information fields: packed prefetch reject response information field 5516, operation tag information field 5511, and CRC information field 5517. In an embodiment, packed prefetch reject information field 5516 identifies prefetch reject response 5503 as a prefetch reject response; operation tag information field 5511 identifies packed prefetch reject response 5503 as a response to a prefetch operation included in packed prefetch request 5501 with a operation tag information field 5511 that includes the unique tag that identifies a unique instance of packed prefetch request 5501 and an address identifier that identifies a unique prefetch operation; CRC information field 5517 contains a value that is computed from the bit-patterns of the values in the other information fields in packed prefetch reject response 5503 and is used to detect an error that occurred during a transfer of packed prefetch reject response 5503 from a source of packed prefetch reject response 5503 to a destination of packed prefetch reject response 5503. In an embodiment, the address identifier in operation tag 5511 is a unique address tag that is included in packed prefetch tag information field 5506. In an embodiment, the address identifier in operation tag 5511 is an index of an address that is included in address information field 5508.

FIG. 8 also depicts an embodiment of a format of a third type of response to packed prefetch request 5501, packed prefetch deferred response 5504. In an embodiment, packed prefetch deferred response 5504 is sent in response to a prefetch operation in a packed prefetch request 5501, from a destination that received the packed prefetch request 5501, when a prefetch operation included in packed prefetch request 5501 is deferred (e.g., queued for a delayed execution or delayed until specified conditions in a local processor or in a remote processor are met). In an embodiment, packed prefetch deferred response 5504 is comprised of at least three information fields: packed prefetch deferred response information field 5518, operation tag information field 5512, and CRC information field 5519. In an embodiment, packed prefetch deferred information field 5518 identifies prefetch deferred response 5504 as a prefetch deferred response; operation tag information field 5512 identifies packed prefetch deferred response 5504 as a response to a prefetch operation included in packed prefetch request 5501 with a operation tag information field 5512 that includes the unique tag that identifies a unique instance of packed prefetch 5501 and an address identifier that identifies a unique prefetch operation; CRC information field 5519 contains a value that is computed from the bit-patterns of the values in the other information fields in packed prefetch deferred response 5504 and is used to detect an error that occurred during a transfer of prefetch reject response 5503 from a source of packed prefetch deferred response 5504 to a destination of packed prefetch deferred response 5504. In an embodiment, the address identifier in operation tag 5511 is a unique address tag that is included in packed prefetch tag information field 5506. In an embodiment, the address identifier in operation tag 5511 is an index of an address that is included in address information field 5508.

In other embodiments, a prefetch protocol includes additional responses to prefetch request 4416 and to packed prefetch request 5501. In an embodiment, a cache that is associated with a source of a prefetch operation marks data that the cache receives from a prefetch operation as prefetched data. In an embodiment, the cache uses the information on prefetched data that it contains in the management of the memory space of the cache (e.g., to determine which data to evict to accommodate new data).

Figure 9:
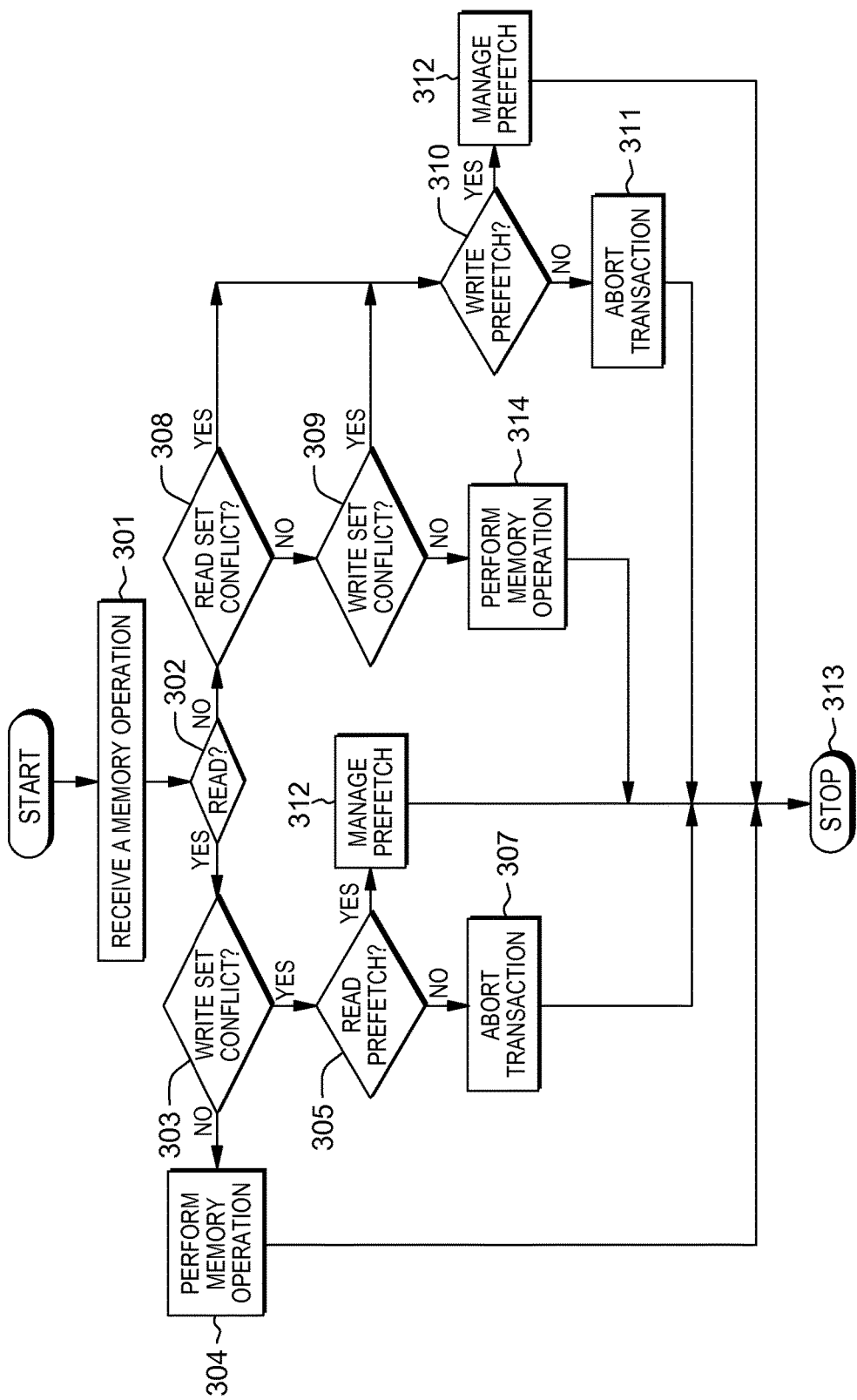
FIG. 9 depicts a flow chart for an operation of transactional memory system depicted in FIG. 5, in accordance with an embodiment of the present invention.

FIG. 9 is a flowchart that depicts the operation of transactional memory system A 1104 in an embodiment. In an embodiment, transactional memory system A 1104 receives a protocol request for memory operation on non-prefetch operations bus 2210 or on prefetch operations bus 2209 (step 301). Abort manager 2207 determines whether the memory operation is a read, i.e., a read type of memory operation (decision step 302). If the memory operation is a read (decision step 302, YES branch), then abort manager 2207 determines whether the address of the read matches an address in write set 2205 of a transaction (decision step 303). If the address of the read does not match an address in write set 2205 of a transaction (decision step 303, NO branch), then the read operation is performed and, for remote requests, a response is sent by abort manager 2207 in accordance with an exemplary protocol of FIG. 7 (step 304) and the process terminates (step 313).

If the address of the read matches an address in write set 2205 of a transaction (decision step 303, YES branch), then abort manager 2207 determines whether the read is a prefetch operation (decision step 305). If the read is a prefetch operation (decision step 305, YES branch), then the read prefetch is managed by prefetch manager 2208 (step 312), and the process terminates (step 313). If the read is not a prefetch operation (decision step 305, NO branch), then the transaction that is associated with the address of the read is aborted (step 307), and the process terminates (step 313).

If the memory operation is not a read (decision step 302, NO branch), then abort manager 2207 determines that the memory operation is a write operation and abort manager 2207 determines whether the address of the write operation matches an address in read set 2206 of a transaction (decision step 308). If the address of the write operation does not match an address in read set 2206 of a transaction (decision step 308, NO branch), then abort manager 2207 determines whether the address of the write operation matches an address in write set 2205 of a transaction (decision step 309). If the address of the write operation does not match an address in write set 2205 of a transaction (decision step 309, NO branch), then the write operation is executed, (i.e., the write is performed for a local write request, and if the write request originated in a remote processor or node, then the appropriate cache line is transferred with exclusive ownership to the remote processor) (step 314) and the process terminates (step 313). If the address of the write operation matches an address in write set 2205 of a transactional memory operation (decision step 309, YES branch), then abort manager 2207 determines whether the write operation is a prefetch operation (decision step 310). If the address of the write operation matches an address in read set 2206 of a transaction (decision step 308, YES branch), then abort manager 2207 determines whether the write operation is a prefetch operation (decision step 310). If abort manager 2207 determines that the write operation is not a prefetch operation (step 310, NO branch), then the transaction that is associated with the address of the write operation is aborted by abort manager 2207 (step 311), and the process terminates (step 313). If the write operation is determined to be a prefetch for write operation (decision step 310, YES branch), then the write prefetch is managed by prefetch manager 2208 (step 312), and the process terminates (step 313).

Figure 10:
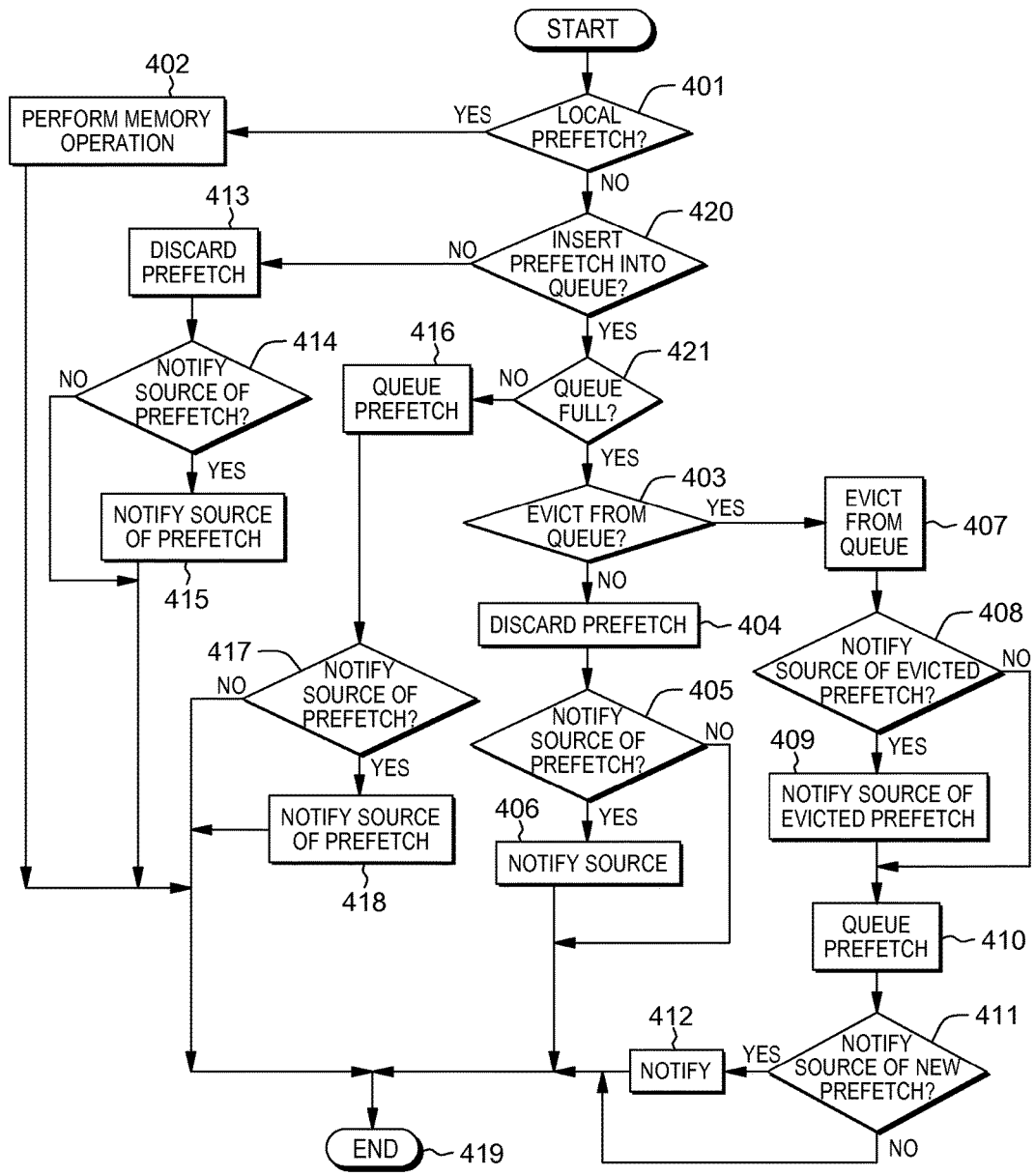
FIG. 10 depicts a flow chart for an operation of prefetch manager depicted in FIG. 5, in accordance with an embodiment of the present invention.
Figure 11:
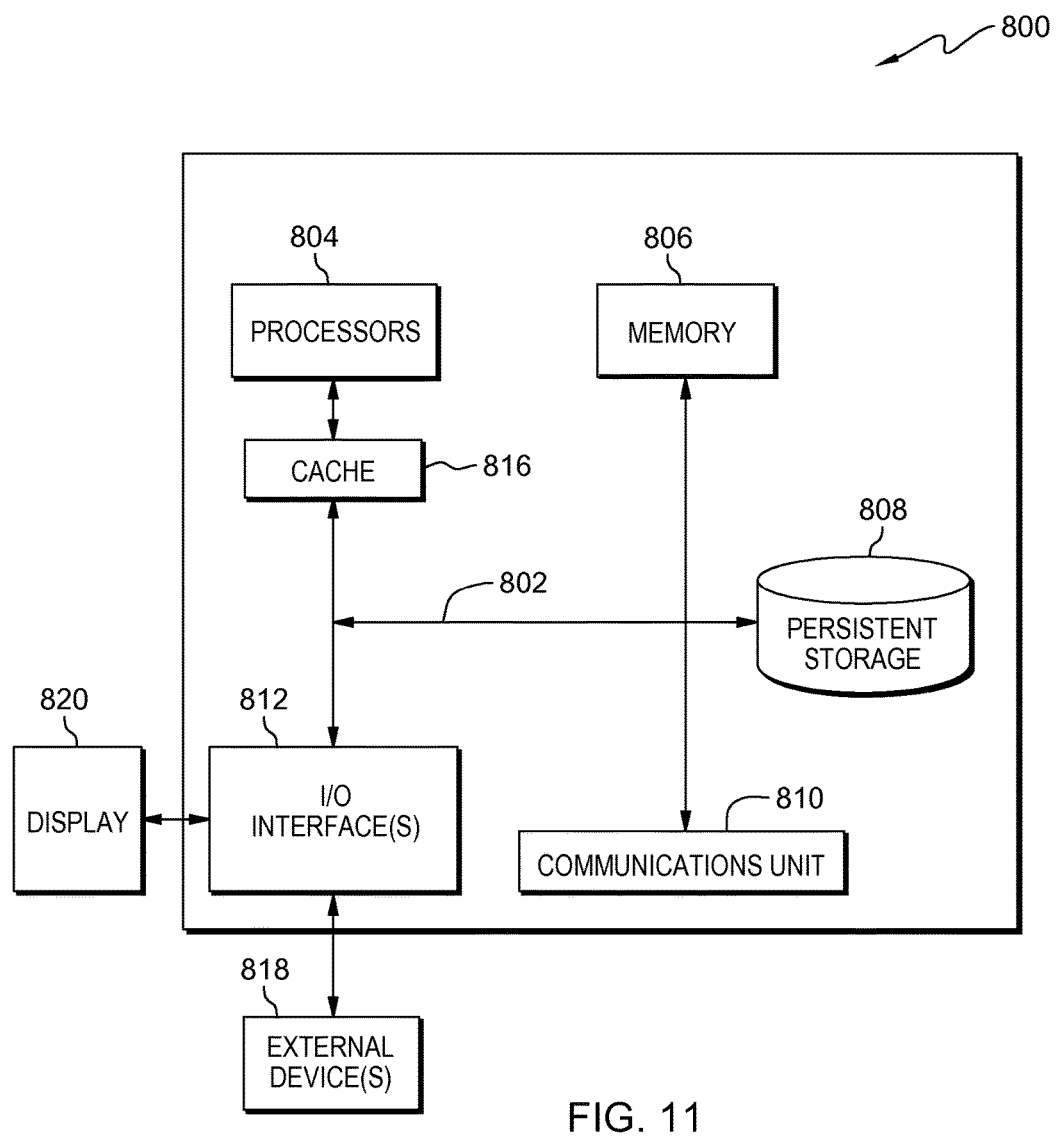
FIG. 11 depicts a block diagram of a computer system that incorporates the cache system that is depicted FIGS. 4 and 5, in accordance with an embodiment of the present invention.

FIG. 10 is a flowchart that depicts the major operations of prefetch manager 2208 to manage a prefetch operation that occur within the manage prefetch step 312 of FIG. 9. Local-remote 2216 in prefetch manager 2208 determines whether the prefetch operation is local or remote (decision step 401). If the prefetch operation is local (decision step 401, YES branch), then the prefetch operation is performed (step 402) and the process terminates (step 419). (In at least one embodiment, performing a prefetch includes indicating a successful prefetch with no further action, as when the requester and requestee are accessing the same cache.) If local-remote 2216 determines that the prefetch operation is remote (decision step 401, NO branch), then queue manager 2214 determines whether the prefetch operation should be inserted into prefetch queue 2213 (decision step 420). If queue manager 2214 determines not to insert the prefetch operation into prefetch queue 2213 (step 420, NO branch), then prefetch manager 2208 discards the prefetch operation (step 413). Prefetch manager 2208 determines whether the source of the prefetch operation should be notified that the prefetch operation was discarded (decision step 414). If prefetch manager 2208 determines that the source of the prefetch operation should be notified that the prefetch operation was discarded (decision step 414, YES branch), then the source of the prefetch operation is notified by prefetch manager 2208 (step 415) and operations in prefetch manager 2208 complete (step 419). If prefetch manager 2208 determines that the source of the prefetch operation should not be notified that the prefetch operation was discarded (decision step 414, NO branch), then operations in prefetch manager 2208 complete (step 419).

If queue manager 2214 determines that the prefetch operation is to be inserted into prefetch queue 2213 (decision step 420, YES branch), then queue manager 2214 determines whether prefetch queue 2213 is full (decision step 421). If prefetch queue 2213 is not full (decision step 421, NO branch), then queue manager 2214 inserts the prefetch operation into prefetch queue 2213 (step 416). Prefetch manager 2208 determines whether to inform the source of the prefetch operation that the prefetch operation was queued (decision step 417). If prefetch manager 2208 determines that the source of the prefetch operation should be notified (decision step 417, YES branch), then prefetch manager 2208 notifies the source of the prefetch operation (step 418), after which the process completes (step 419). If prefetch manager 2208 determines that the source of the prefetch operation should not be notified (decision step 417, NO branch), then the process completes (step 419).

If queue manager 2214 determines that prefetch queue 2213 is full (decision step 421, YES branch), then queue manager 2214 determines whether to evict an entry from prefetch queue 2213 (decision step 403). If queue manager 2214 determines that an entry is to be evicted (decision step 403, YES branch), then queue manager 2214 evicts an entry from prefetch queue 2215 (step 407). Prefetch manager 2208 determines whether to notify the source of the evicted prefetch operation of the eviction of the prefetch operation (decision step 408). If prefetch manager 2208 determines to notify the source of the evicted prefetch operation (decision step 408, YES branch), then the source of the evicted prefetch operation is notified of the eviction by prefetch manager 2208 (step 409) and the new prefetch operation is queued in prefetch queue 2213 by prefetch manager 2208 (step 410). If prefetch manager 2208 determines that the source of the evicted prefetch operation is not to be notified (decision step 408, NO branch), then the new prefetch operation is queued in prefetch queue 2213 by prefetch manager 2208 (step 410). Prefetch manager 2208 determines whether to notify the source of the new prefetch operation of the queuing of the new prefetch operation (decision step 411). If prefetch manager 2208 determines that the source of the new prefetch operation is to be notified of the queuing of the new prefetch operation (decision step 411, YES branch), then the source of the new prefetch operation is notified, by prefetch manager 2208, thereby indicating that the new prefetch operation was queued (step 412) and the process completes (step 419). If prefetch manager 2208 determines that the source of the new prefetch operation is not to be notified (decision step 411, NO branch), then the process completes (step 419).

If queue manager 2214 determines that a prefetch operation is not to be evicted (decision step 403, NO branch), then the new prefetch operation is discarded by prefetch manager 2208 (step 404). Prefetch manager 2208 determines whether to notify the source of the discarded prefetch operation of the discarding of the prefetch operation (decision step 405). If prefetch manager 2208 determines that the source of the discarded prefetch operation should be notified that the prefetch operation was discarded (decision step 405, YES branch), then the source of the discarded prefetch operation is notified of that discarding by prefetch manager 2208 (step 406) and the process completes (step 419). If prefetch manager 2208 determines that the source of the evicted prefetch operation is not to be notified of the discarding of the prefetch operation (decision step 405, NO branch), then the process completes (step 419).

If queue manager 2214 determines that prefetch queue 2213 is not full (decision step 402, NO branch), then the prefetch operation is queued by queue manager 2214 (step 416) and prefetch manager 2208 determines whether the source of the prefetch operation should be notified that the prefetch operation was queued (decision step 417). If prefetch manager 2208 determines that the source of the prefetch operation is to be notified that the prefetch operation was queued (decision step 417, YES branch), then prefetch manager 2208 notifies the source of the prefetch operation thereby indicating that the prefetch operation was queued (step 418) and the process completes (step 419). If prefetch manager 2208 determines that the source of the prefetch operation is not to be notified that the prefetch operation was queued (decision step 417, NO branch), the process completes (step 419).

In accordance with one aspect of one embodiment, queued prefetches are performed when the conflicting transaction terminates, either by way of successful completion, or by way of a transaction abort.

In at least one embodiment of prefetch manager 2208, the determinations of whether to perform notifications responsive to discarding, queuing, evicting, and so forth, of prefetch requests is set at a design time of prefetch manager 2208 and incorporated into the logic of prefetch manager 2208. In one embodiment, such determinations correspond to one or more control values, which may be configured using a variety of ways, such as software-writeable control registers, firmware-writeable control registers, control values configured at boot time, e.g., from a read-only storage (such as a boot EPROM), or by other reversible or irreversible means (e.g., by severing an electric connection at chip production time using a fuse or other means for controllably interrupting an electric connection, the presence or absence of said connection being indicative of a selection).

FIG. 8 depicts computer system 800 that is an example of a system that includes computer system 1101. Processors 804 and cache 816 are substantially equivalent to processor A 1102, cache system A 1103, processor B1106, and cache system B 1107. Computer system 800 includes communications fabric 802, which provides communications between computer processor(s) 804, memory 806, persistent storage 808, communications unit 810, and input/output (I/O) interface(s) 812. Communications fabric 802 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 806 and persistent storage 808 are computer readable storage media. In this embodiment, memory 806 includes random access memory (RAM). In general, memory 806 can include any suitable volatile or non-volatile computer readable storage media. Cache 816 is a fast memory that enhances the performance of processors 804 by holding recently accessed data and data near accessed data from memory 806.

Program instructions and data used to practice embodiments of the present invention may be stored in persistent storage 808 for execution by one or more of the respective processors 804 via cache 816 and one or more memories of memory 806. In an embodiment, persistent storage 808 includes a magnetic hard disk drive.

Alternatively, or in addition to a magnetic hard disk drive, persistent storage 808 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of persistent storage 808.

Communications unit 810, in these examples, provides for communications with other data processing systems or devices. In these examples, communications unit 810 includes one or more network interface cards. Communications unit 810 may provide communications through the use of either or both physical and wireless communications links. Program instructions and data used to practice embodiments of the present invention may be downloaded to persistent storage 808 through communications unit 810.

I/O interface(s) 812 allows for input and output of data with other devices that may be connected to each computer system. For example, I/O interface 812 may provide a connection to external devices 818 such as a keyboard, keypad, a touch screen, and/or some other suitable input device. External devices 818 can also include portable computer readable storage media such as, for example, thumb drives, portable optical or magnetic disks, and memory cards. Software and data used to practice embodiments of the present invention can be stored on such portable computer readable storage media and can be loaded onto persistent storage 808 via I/O interface(s) 812. I/O interface(s) 812 also connect to a display 820.

Display 820 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

Each respective figure, in addition to illustrating methods of and functionality of the present invention at various stages, also illustrates the logic of the method as implemented, in whole or in part, by one or more devices and structures. Such devices and structures are configured to (i.e., include one or more components, such as resistors, capacitors, transistors and the like that are connected to enable the performing of a process) implement the method of merging one or more non-transactional stores and one or more thread-specific transactional stores into one or more cache line templates in a store buffer in a store cache. In other words, one or more computer hardware devices can be created that are configured to implement the method and processes described herein with reference to the Figures and their corresponding descriptions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable other of ordinary skill in the art to understand the embodiments disclosed herein.

Embodiments of the present invention may be used in a variety of electronic applications, including but not limited to advanced sensors, memory/data storage, semiconductors, microprocessors and other applications.

A resulting device and structure, such as an integrated circuit (IC) chip can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may be included by only some of the described embodiments. Accordingly, the invention is not to be seen as limited by the foregoing description. A reference to an element in the singular is not intended to mean "one and only one" unless specifically stated, but rather "one or more." All structural and functional equivalents to the elements of the various embodiments described throughout this disclosure that are known or later come to be known to those of ordinary skill in the art are expressly incorporated herein by reference and intended to be encompassed by the invention. It is therefore to be understood that changes may be made in the particular embodiments disclosed which are within the scope of the present invention as outlined by the appended claims.

What is claimed is:

1. A computer program product to prevent a prefetch memory operation from causing a transaction to abort, the program instructions comprising:
   one or more computer readable storage media and program instructions stored on the one or more computer readable storage media, the program instructions comprising:
      program instructions to receive by a local processor of a group of one or more processors of a local computer a prefetch request from a remote processor of a remote computer that is in communication with the local computer;
      program instructions to, prior to execution of program instructions included in the prefetch request, determine whether execution of the prefetch request is predicted to cause an address conflict by accessing a memory address that is accessed during an execution of a transaction of the local processor;

program instructions to respond to a determination that execution of the prefetch request is predicted to cause a conflict during the execution of the transaction by determining an evaluation of the prefetch request prior to execution of the program instructions included in the prefetch request based, at least in part, on (i) a comparison of a priority of the local processor with a priority of the remote processor and (ii) a condition that exists in one or both of the local processor and the remote processor; and program instructions to, based on a result of the evaluation, modify one or more program instructions that govern execution of the program instructions included in the prefetch request to include program instruction to perform at least one of: (i) a quiesce of the prefetch request prior to execution of the prefetch request, (ii) a delay in execution of the prefetch request for a predetermined delay period, and (iii) an execution of the prefetch request, based, at least in part, on the evaluation the prefetch request.

2. The computer program product of claim 1, further comprising:
program instructions to respond to at least one of (i) a determination that the local processor has no transaction, and (ii) a determination that an execution of the prefetch request is not predicted to cause the conflict during the execution of the transaction of the local processor, by executing the prefetch request, wherein the prefetch request is one of a read prefetch instruction or a write prefetch instruction.

3. The computer program product of claim 1, wherein program instructions to respond to a determination that execution of the prefetch request is predicted to cause a conflict during the execution of the transaction by determining an evaluation of the prefetch request prior to execution of the prefetch request comprise:
program instructions to respond to a determination that the conflict is predicted to cause an abort of the transaction by executing one or more of:
program instructions to (i) compare a priority of the prefetch request with a priority of the transaction and (ii) based, at least in part, on a result of the comparison, perform at least one of (a) an execution of the transaction, based, at least in part, on the comparison indicating that the priority of the transaction is greater than the priority of the prefetch request, and (b) an execution of the prefetch request, based, at least in part, on the comparison indicating that the priority of the prefetch request is greater than the priority of the transaction;
program instructions to compare a priority of the local processor with a priority of the remote processor;
program instructions to determine an importance of the prefetch request;
program instructions to determine one or more conditions in the local processor;
program instructions to determine one or more conditions in the remote processor; and
program instructions to determine that the prefetch request is to be (a) discarded or (b) processed as either (i) a short-range prefetch request or (ii) a long-range prefetch request.

4. The computer program product of claim 1, wherein quiescing the prefetch request includes monitoring one or more conditions in the local processor and executing the prefetch request when the one or more conditions meet a criterion.

5. The computer program product of claim 1, further comprising:
program instructions to respond to the determination that execution of the prefetch request is predicted to cause the conflict during the execution of the transaction by delaying execution of the prefetch request for the delay period, wherein the delay period is based on a prefetch time horizon that is associated with a prefetch operation that is divided into time steps with each time step specified in a preset number of cycles that a receiver of the prefetch request uses to manage the prefetch request; and
program instructions to perform an action at an end of the delay period that is based on one or more conditions in the local processor, wherein the action includes one or more of (i) aborting the prefetch request, (ii) further delaying execution of the prefetch request, (iii) quiescing the prefetch request, and (iv) executing the prefetch request.

6. The computer program product of claim 5, further comprising:
program instructions to notify the remote processor of the action taken at the end of the delay period.

7. The computer program product of claim 5, wherein delaying the prefetch request comprises queuing the prefetch request in a queue in a group of one or more queues.

8. The computer program product of claim 7, further comprising:
program instructions to notify the remote processor that the prefetch request was queued.

9. The computer program product of claim 6, wherein the group of one or more queues includes one or both of: (i) at least one queue, of the one or more queues, that holds all prefetch requests for exclusive ownership and only prefetch requests for exclusive ownership, and (ii) at least one queue, of the one or more queues, that holds all prefetch requests for shared ownership and only prefetch requests for shared ownership.

10. The computer program product of claim 6, wherein each queue in the one or more queues holds all prefetch requests from a same remote processor and only prefetch requests from the same remote processor.

11. A computer system to enable a prefetch request to be controlled in response to conditions in a receiver of the prefetch request and to conditions in a source of the prefetch request, the computer system comprising:
one or more computer processors;
one or more computer readable storage medium;
program instructions stored on the computer readable storage medium for execution by at least one of the one or more processors, the program instructions comprising:
program instructions to receive by a local processor of a group of one or more processors of a local computer a prefetch request from a remote processor of a remote computer that is in communication with the local computer;
program instructions to, prior to execution of program instructions included in the prefetch request, determine whether execution of the prefetch request is predicted to cause an address conflict by accessing a memory address that is accessed during an execution of a transaction of the local processor;
program instructions to respond to a determination that execution of the prefetch request is predicted to cause a conflict during the execution of the transaction by determining an evaluation of the prefetch request prior to execution of the program instructions included in the prefetch request based, at least in part, on (i) a comparison of a priority of the local processor with a priority of the remote processor and (ii) a condition that exists in one or both of the local processor and the remote processor; and program instructions to, based on a result of the evaluation, modify one or more program instructions that govern execution of the program instructions included in the prefetch request to include program instruction to perform at least one of: (i) a quiesce of the prefetch request prior to execution of the prefetch request, (ii) a delay in execution of the prefetch request for a predetermined delay period, and (iii) an execution of the prefetch request, based, at least in part, on the evaluation the prefetch request.

12. The computer system of claim 11, further comprising: program instructions to respond to at least one of (i) a determination that the local processor has no transaction, and (ii) a determination that an execution of the prefetch request is not predicted to cause the conflict during the execution of the transaction of the local processor, by executing the prefetch request, wherein the prefetch request is one of a read prefetch instruction or a write prefetch instruction.

13. The computer system of claim 11, wherein program instructions to respond to a determination that execution of the prefetch request is predicted to cause a conflict during the execution of the transaction by determining an evaluation of the prefetch request prior to execution of the prefetch request comprise:

program instructions to respond to a determination that the conflict is predicted to cause an abort of the transaction by executing one or more of:
program instructions to (i) compare a priority of the prefetch request with a priority of the transaction and (ii) based, at least in part, on a result of the comparison, perform at least one of (a) an execution of the transaction, based, at least in part, on the comparison indicating that the priority of the transaction is greater than the priority of the prefetch request, and (b) an execution of the prefetch request, based, at least in part, on the comparison indicating that the priority of the prefetch request is greater than the priority of the transaction;
program instructions to compare a priority of the local processor with a priority of the remote processor;
program instructions to determine an importance of the prefetch request;
program instructions to determine one or more conditions in the local processor;
program instructions to determine one or more conditions in the remote processor; and
program instructions to determine that the prefetch request is to be (a) discarded or (b) processed as either (i) a short-range prefetch request or (ii) a long-range prefetch request.

14. The computer system of claim 11, wherein quiescing the prefetch request includes monitoring one or more conditions in the local processor and executing the prefetch request when the one or more conditions meet a criterion.

15. The computer system of claim 11, further comprising:
program instructions to respond to the determination that execution of the prefetch request is predicted to cause the conflict during the execution of the transaction by delaying execution of the prefetch request for the delay period, wherein the delay period is based on a prefetch time horizon that is associated with a prefetch operation that is divided into time steps with each time step specified in a preset number of cycles that a receiver of the prefetch request uses to manage the prefetch request; and
program instructions to perform an action at an end of the delay period that is based on one or more conditions in the local processor, wherein the action includes one or more of (i) aborting the prefetch request, (ii) further delaying execution of the prefetch request, (iii) quiescing the prefetch request, and (iv) executing the prefetch request.

16. The computer system of claim 15, further comprising: program instructions to notify the remote processor of the action taken at the end of the delay period.

17. The computer system of claim 15, wherein delaying the prefetch request comprises queuing the prefetch request in a queue in a group of one or more queues.

18. The computer system of claim 17, further comprising: program instructions to notify the remote processor that the prefetch request was queued.

19. The computer system of claim 16, wherein each queue in the one or more queues holds all prefetch requests from a same remote processor and only prefetch requests from the same remote processor.

20. The computer system of claim 16, wherein the group of one or more queues includes one or both of: (i) at least one queue, of the one or more queues, that holds all prefetch requests for exclusive ownership and only prefetch requests for exclusive ownership, and (ii) at least one queue, of the one or more queues, that holds all prefetch requests for shared ownership and only prefetch requests for shared ownership.

* * * * *